(12) United States Patent
Ishihara et al.

(10) Patent No.: US 11,417,051 B2
(45) Date of Patent: Aug. 16, 2022

(54) INFORMATION PROCESSING APPARATUS AND INFORMATION PROCESSING METHOD TO ENSURE VISIBILITY OF SHIELDED VIRTUAL OBJECTS

(71) Applicant: SONY CORPORATION, Tokyo (JP)

(72) Inventors: Atsushi Ishihara, Tokyo (JP); Hirotake Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/276,759

(22) PCT Filed: Sep. 13, 2019

(86) PCT No.: PCT/JP2019/036033
§ 371 (c)(1),
(2) Date: Mar. 16, 2021

(87) PCT Pub. No.: WO2020/066682
PCT Pub. Date: Apr. 2, 2020

(65) Prior Publication Data
US 2021/0350611 A1 Nov. 11, 2021

(30) Foreign Application Priority Data

Sep. 28, 2018 (JP) .............................. JP2018-183270

(51) Int. Cl.
*G06T 15/20* (2011.01)
*G06T 7/00* (2017.01)
(Continued)

(52) U.S. Cl.
CPC ............ *G06T 15/20* (2013.01); *G02B 27/017* (2013.01); *G06T 7/75* (2017.01); *G06T 7/97* (2017.01); *G06T 2207/30196* (2013.01)

(58) Field of Classification Search
CPC .. G06T 15/02; G06T 7/97; G06T 7/75; G06T 2207/30196; G02B 27/017
See application file for complete search history.

(56) References Cited

U.S. PATENT DOCUMENTS

2005/0231532 A1 10/2005 Suzuki et al.
2012/0014558 A1* 1/2012 Stafford ................ A63F 13/426
382/103
(Continued)

FOREIGN PATENT DOCUMENTS

JP 2005-293142 A 10/2005
JP 2013-15796 A 1/2013
WO 2015/090421 A1 6/2015

OTHER PUBLICATIONS

International Search Report and Written Opinion of PCT Application No. PCT/JP2019/036033, dated Nov. 5, 2019, 09 pages of ISRWO.

(Continued)

*Primary Examiner* — Terrell M Robinson
(74) *Attorney, Agent, or Firm* — Chip Law Group

(57) ABSTRACT

The present disclosure relates to an information processing apparatus and an information processing method that enable to ensure visibility when a virtual object is shielded. An information processing apparatus is provided that includes a display control unit that controls a display so as to display a virtual object by using a first display parameter in a first state where it is determined that the virtual object displayed by the display is hidden by at least one real object as viewed from a first user of the display and display the virtual object by using a second display parameter different from the first display parameter in a second state where it is determined that the virtual object is hidden by real objects more than that in the first state as viewed from the first user.

20 Claims, 20 Drawing Sheets

(51) Int. Cl.
*G06T 7/73* (2017.01)
*G02B 27/01* (2006.01)

(56) References Cited

U.S. PATENT DOCUMENTS

| | | | | |
|---|---|---|---|---|
| 2013/0093788 A1* | 4/2013 | Liu | ............... | G02B 27/017 |
| | | | | 345/633 |
| 2013/0335301 A1* | 12/2013 | Wong | ............... | G06F 3/013 |
| | | | | 345/8 |
| 2016/0307374 A1 | 10/2016 | Kurz et al. | | |
| 2018/0357831 A1* | 12/2018 | Takayama | ............... | G06T 19/20 |
| 2019/0221043 A1* | 7/2019 | Kopper | ............... | G06F 3/014 |

OTHER PUBLICATIONS

Odashima, et al., "An outdoor wearable augmented reality system using a hand-held GPS", IEICE Technical Report, ISSN 0913-5685, vol. 102, Jan. 9, 2013, pp. 73-78.

* cited by examiner

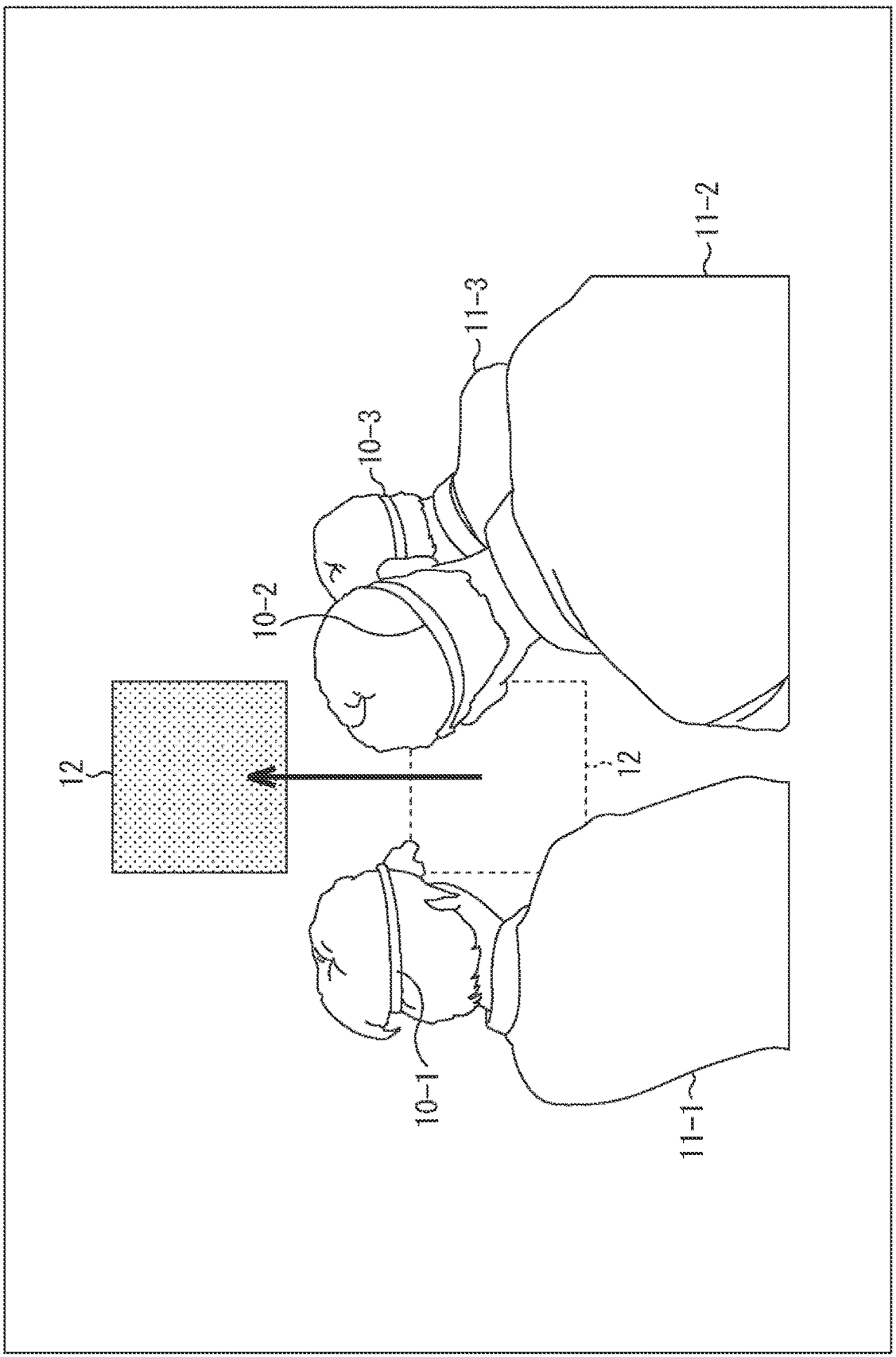

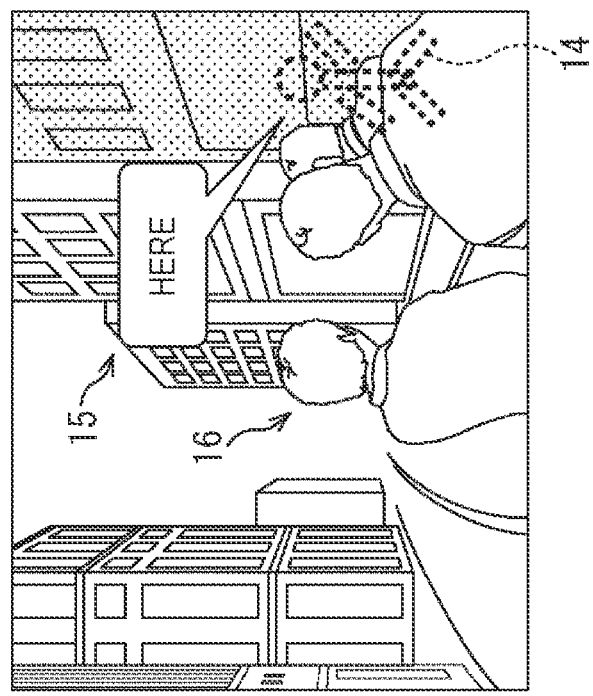
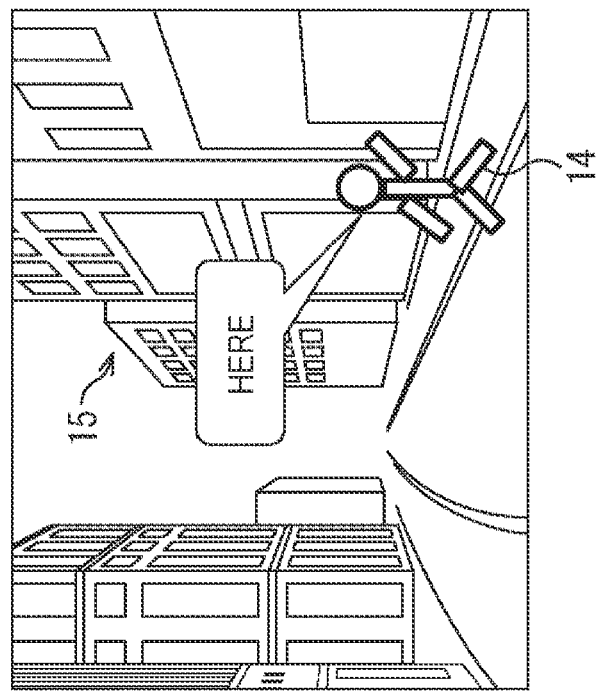
FIG. 17A
FIG. 17B

INFORMATION PROCESSING APPARATUS AND INFORMATION PROCESSING METHOD TO ENSURE VISIBILITY OF SHIELDED VIRTUAL OBJECTS

CROSS REFERENCE TO RELATED APPLICATIONS

This application is a U.S. National Phase of International Patent Application No. PCT/JP2019/036033 filed on Sep. 13, 2019, which claims priority benefit of Japanese Patent Application No. JP 2018-183270 filed in the Japan Patent Office on Sep. 28, 2018. Each of the above-referenced applications is hereby incorporated herein by reference in its entirety.

TECHNICAL FIELD

The present disclosure relates to an information processing apparatus, an information processing method, and a program, and more particularly, to an information processing apparatus, an information processing method, and a program that can shield a virtual object and ensure visibility.

BACKGROUND ART

In recent years, technologies regarding Augmented Reality (AR) that expands the real world by superimposing and displaying a virtual object on a real object in the real world by using various electronic apparatuses have been actively researched and developed.

For example, Patent Document 1 discloses a technology that displays a display object (virtual object), related to a real object that can be viewed through a transparent display, on the transparent display having optical transparency.

CITATION LIST

Patent Document

Patent Document 1: Japanese Patent Application Laid-Open No. 2013-15796

SUMMARY OF THE INVENTION

Problems to be Solved by the Invention

By the way, in order to reduce uncomfortable feeling when the virtual object is superimposed and displayed on the real world and to give a clue regarding a depth to a user, there is a case where shielding processing of shielding the virtual object by the real object is executed.

However, by executing such shielding processing, there is a possibility that the virtual object is excessively shielded by the real object and cannot be viewed depending on a positional relationship with the surrounding real object. Therefore, a technology for ensuring visibility of the virtual object is required.

The present disclosure has been made in view of such a situation, and makes it possible to shield a virtual object and ensure visibility.

Solutions to Problems

An information processing apparatus according to one aspect of the present disclosure is an information processing apparatus including a display control unit that controls a display so as to display a virtual object by using a first display parameter in a first state where it is determined that the virtual object displayed by the display is hidden by at least one real object as viewed from a first user of the display and display the virtual object by using a second display parameter different from the first display parameter in a second state where it is determined that the virtual object is hidden by real objects more than that in the first state as viewed from the first user.

The information processing apparatus according to one aspect of the present disclosure may be an independent apparatus or may be an internal block configuring a single apparatus.

An information processing method and a program according to one aspect of the present disclosure are respectively an information processing method and a program corresponding to the information processing apparatus according to the one aspect of the present disclosure.

In the information processing apparatus, the information processing method, and the program according to one aspect of the present disclosure, in a first state where it is determined that a virtual object displayed by a display is hidden by at least one real object as viewed from a first user of the display, the virtual object is displayed by using a first display parameter, and in a second state where it is determined that the virtual object is hidden by the real objects more than that in the first state as viewed from the first user, the virtual object is displayed by using a second display parameter different from the first display parameter.

Effects of the Invention

According to one aspect of the present disclosure, it is possible to shield a virtual object and ensure visibility.

Note that the effects described herein are not limited and that the effect may be any effects described in the present disclosure.

BRIEF DESCRIPTION OF DRAWINGS

FIG. 7 is a diagram illustrating a first example of a display position of the shielded virtual object.

FIGS. 17A and 17B are diagrams illustrating an example of use of the augmented reality system to which the technology according to the present disclosure is applied.

MODE FOR CARRYING OUT THE INVENTION

Hereinafter, embodiments of the technology (the present technology) according to the present disclosure will be described with reference to the drawings. Note that the description will be made in the following order.
1. First Embodiment
2. Second Embodiment
3. Modification
4. Configuration of Computer 1. First Embodiment (Example of System Configuration)

Figure 1:
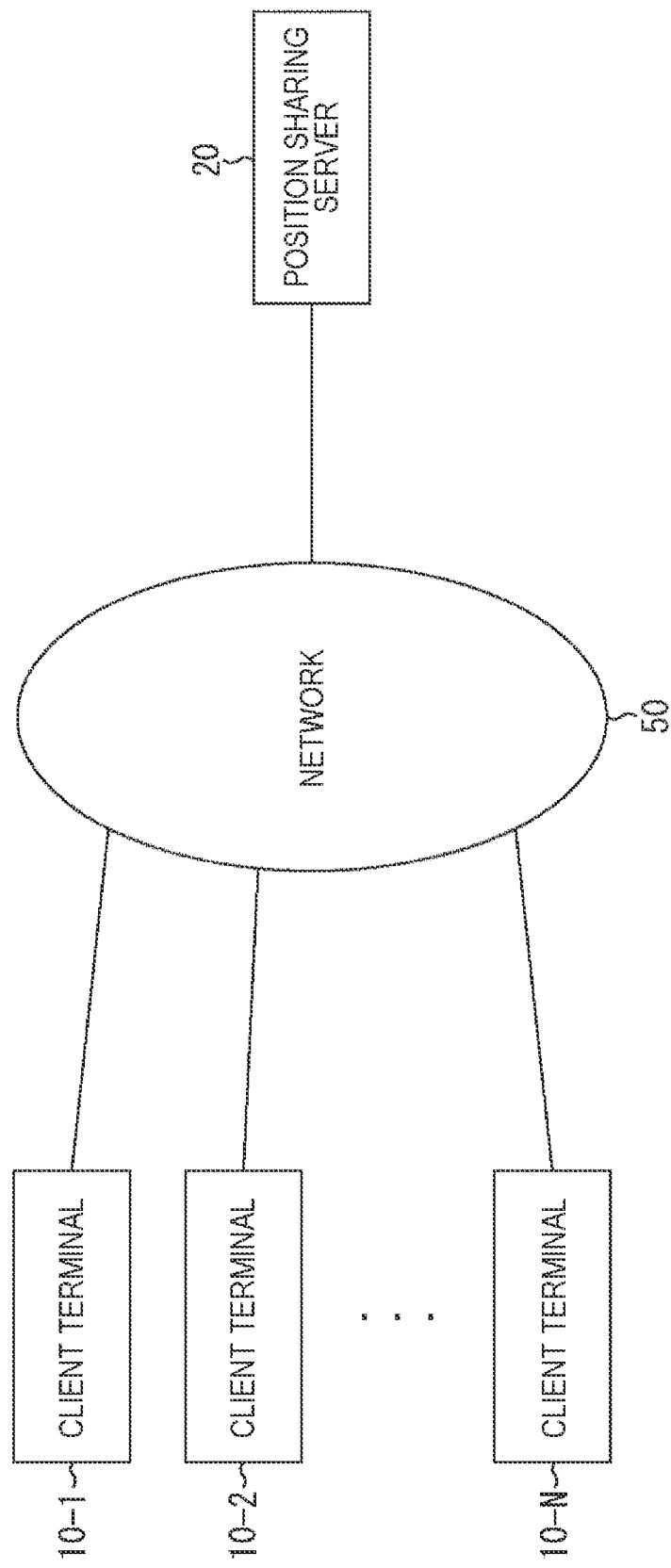
FIG. 1 is a diagram illustrating an example of a configuration of an augmented reality system to which the technology according to the present disclosure is applied.

FIG. 1 is a diagram illustrating an example of a configuration of an augmented reality system to which the technology according to the present disclosure is applied.

In FIG. 1, the augmented reality system includes client terminals 10-1 to 10-N (N: integer equal to or more than one), a position sharing server 20, and a network 50. Each of the client terminals 10-1 to 10-N can exchange data with the position sharing server 20 via the network 50 including the Internet, a mobile phone network, or the like.

The client terminal 10-1 is, for example, an electronic apparatus (information processing apparatus) such as a wearable terminal such as a glass-type information terminal, a Head Mounted Display (HMD), a smartphone, a mobile phone, a tablet-type computer, a personal computer, a game machine, or the like. Note that it is mainly assumed that the client terminal 10-1 be a mobile terminal that can be carried and used by a user. However, the client terminal 10-1 is not limited to that and may be a fixed terminal.

For example, the client terminal 10-1 is mounted on a user's head, displays (transmits) a real object that exists in the real world on a display device (display) fixed to a direction of a line-of-sight of the user, and superimposes and displays a virtual object that does not exist in the real world (real space) by the Augmented Reality (AR) technology.

Similarly to the client terminal 10-1, each of the client terminals 10-2 to 10-N includes an electronic apparatus such as a wearable computer, a head mounted display, a smartphone, or the like and presents the virtual object together with the real object to the user.

The position sharing server 20 is a server used to share position information and direction information of each of the client terminals 10-1 to 10-N (user who wears the client terminal). The position sharing server 20 receives the position information and the direction information transmitted from the client terminals 10-1 to 10-N via the network 50. Furthermore, the position sharing server 20 transmits the position information and the direction information received from each client terminal 10 to the other client terminal 10 via the network 50.

In the augmented reality system configured as described above, in a case where a plurality of users wearing (or holding) the client terminal 10 uses the same AR service, when the virtual object is displayed in the real world, the virtual object is displayed according to the position (viewpoint) of each user. Note that, in the following description, while a real object (including person such as user) existing in the real world (real space) is referred to as a real object $O_R$, a virtual object that does not exist in the real world (real space) is referred to as a virtual object $O_V$.

Figure 2:
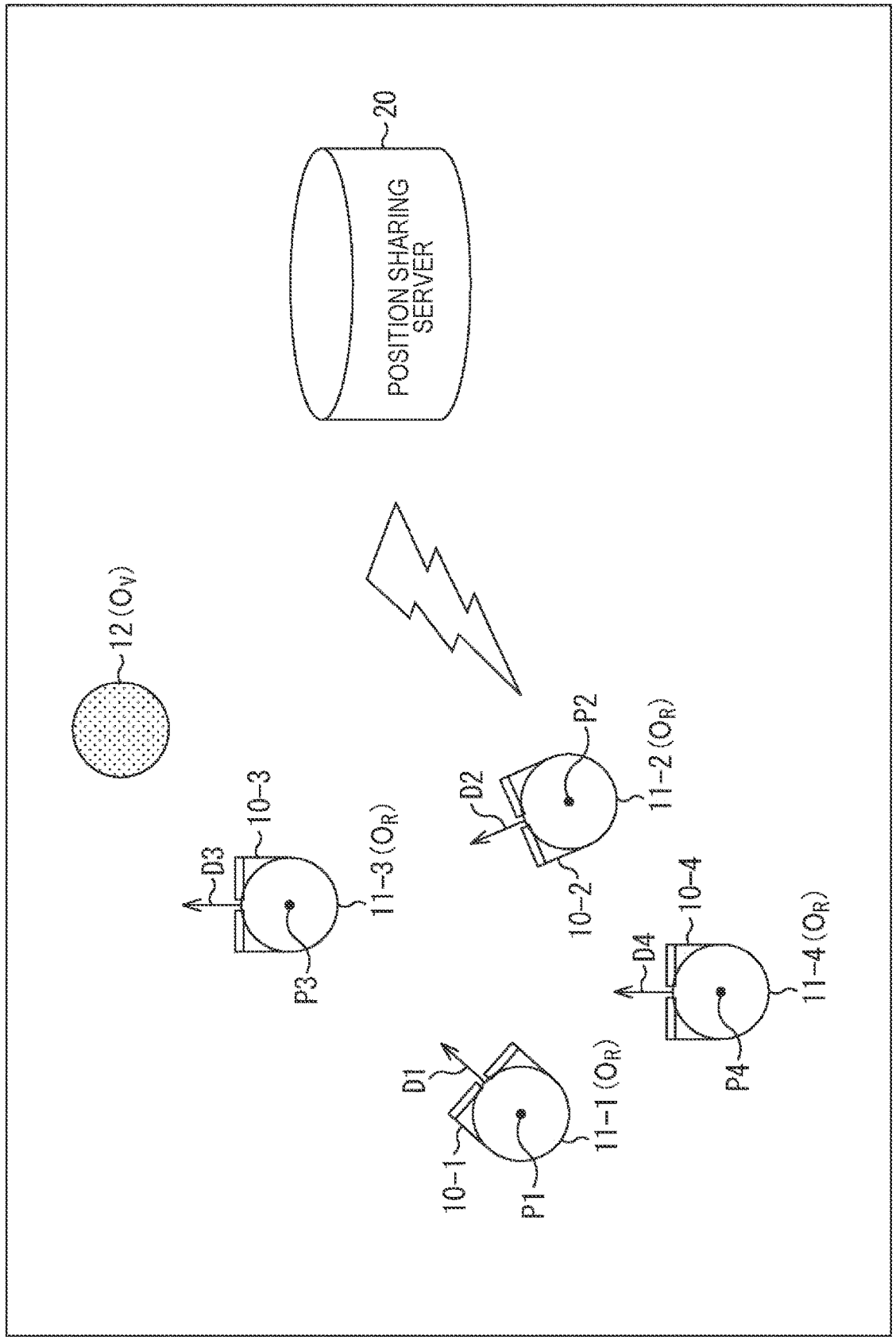
FIG. 2 is a diagram illustrating an example of use of the augmented reality system to which the technology according to the present disclosure is applied.

Here, FIG. 2 illustrates an example of use of the augmented reality system to which the technology according to the present disclosure is applied.

In FIG. 2, a case is schematically illustrated where a display object 12 is displayed in front of four users when the four users including users 11-1 to 11-4 respectively wear the client terminals 10-1 to 10-4 and use the same AR service. In this case, it can be said that the users 11-1 to 11-4 are the real objects $O_R$, and the display object 12 is the virtual object $O_V$.

Note that, in the following description, a user to be focused among the plurality of users who receives the provision of the same AR service (for example, AR game) is simply referred to as a user (first user), and users different from the user to be focused is referred to as the other user (second user). The users are distinguished in this way.

For example, for the user 11-1 (first user) wearing the client terminal 10-1, the users 11-2 to 11-4 are the other users (second user), or for example, for the user 11-4 (first user) wearing the client terminal 10-4, the users 11-1 to 11-3 can be said as the other users 11 (second user).

Each of the client terminals 10-1 to 10-4 can share the positions thereof in the same coordinates by exchanging the position information with the position sharing server 20 via the network 50. Furthermore, here, in addition to the position information, the direction information indicating a head orientation of each user 11 can be shared.

Specifically, a position P1 and a head orientation D1 of the user 11-1 wearing the client terminal 10-1, a position P2 and a head orientation D2 of the user 11-2 wearing the client terminal 10-2, a position P3 and a head orientation D3 of the user 11-3 wearing the client terminal 10-3, and a position P4 and a head orientation D4 of the user 11-4 wearing the client terminal 10-4 are shared by the client terminals 10-1 to 10-4.

Each of the client terminals 10-1 to 10-4 determines a degree of shielding the other user 11 with respect to the display object 12 on the basis of the information such as the position information and the direction information shared via the position sharing server 20, determines a display parameter corresponding to the determination result, and displays the display object 12 by using the determined display parameter.

This display parameter is associated with, for example, an attribute such as a display position of the display object 12.

In this way, in the augmented reality system to which the technology according to the present disclosure is applied, when each client terminal 10 displays the virtual object $O_V$, a shielding degree of the real object $O_R$ with respect to the virtual object $O_V$ is determined, and the virtual object $O_V$ is displayed on the basis of the display parameter corresponding the determination result.

Note that, in FIG. 1, for convenience of description, minimum components are illustrated as the augmented reality system. However, other components may be added, for example, to install a dedicated AR server that provides functions regarding the AR technology. Furthermore, the real object $O_R$ is not limited to the user 11 and includes real objects, for example, furniture and buildings.

(Configuration of Client Terminal)

Figure 3:
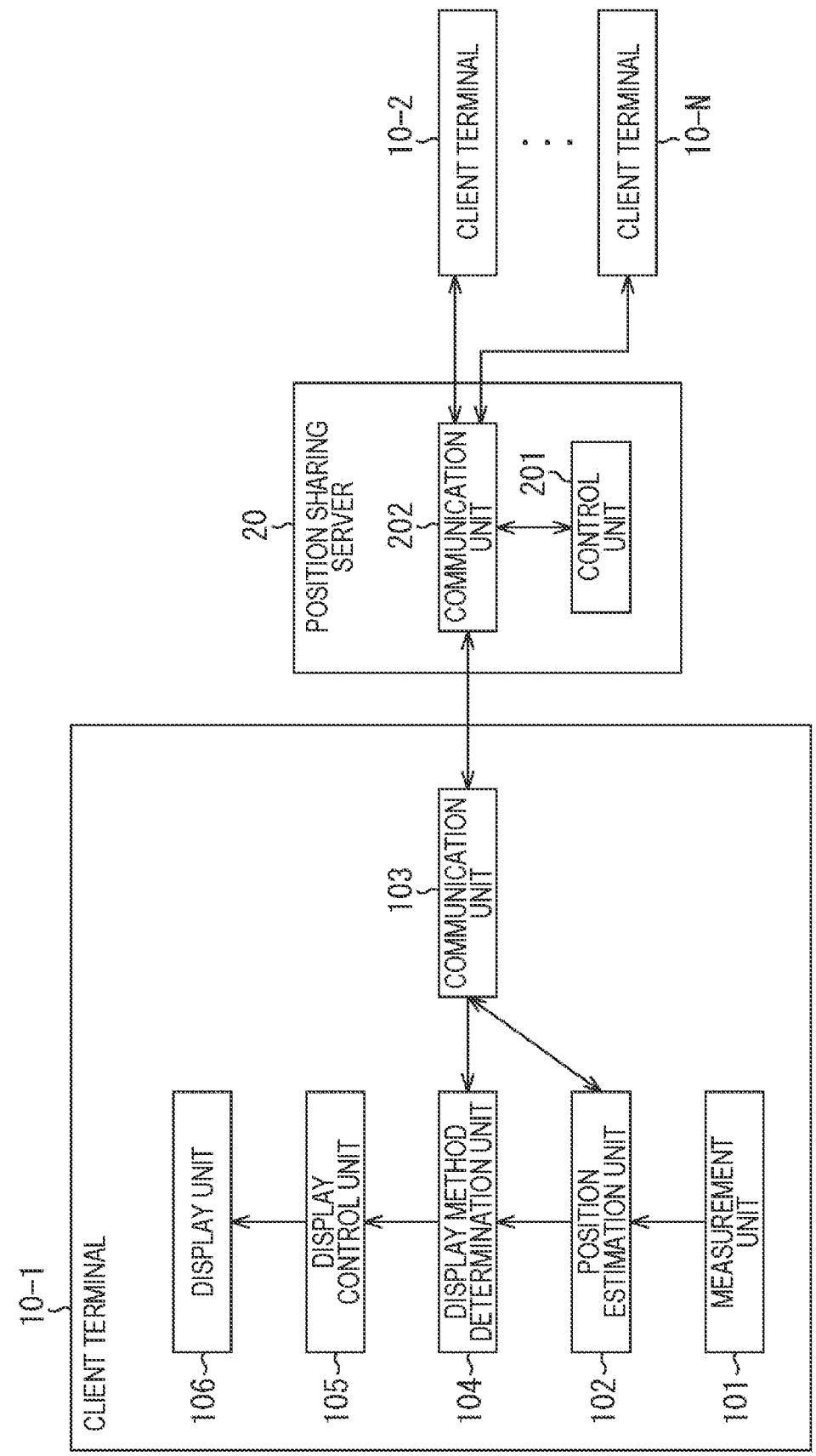
FIG. 3 is a block diagram illustrating an example of a configuration of a client terminal and a position sharing server.

FIG. 3 illustrates an example of a configuration of the client terminal 10-1 in FIG. 1.

In FIG. 3, the client terminal 10-1 includes a measurement unit 101, a position estimation unit 102, a communication unit 103, a display method determination unit 104, a display control unit 105, and a display unit 106.

The measurement unit 101 includes various sensors, for example, a stereo camera, a gyro sensor, an acceleration sensor, or the like. The measurement unit 101 performs various measurements according to an operation of the user 11-1 wearing the client terminal 10-1 and supplies measured information obtained as a result of the measurement to the position estimation unit 102.

The measured information includes, for example, information such as sensor information including angular speed information measured by the gyro sensor, acceleration information measured by the acceleration sensor, or the like in addition to distance information measured by the stereo camera.

The position estimation unit 102 estimates a position of the client terminal 10-1 on the basis of the measured information supplied from the measurement unit 101 and supplies the position information obtained as a result of the estimation to the communication unit 103 and the display method determination unit 104. Here, by using information such as the distance information as the measured information, for example, it is possible to estimate the position of the user 11-1 with respect to a real object around the user 11-1 (relative position).

Furthermore, the position estimation unit 102 estimates the head orientation of the user 11-1 wearing the client terminal 10-1 on the basis of the measured information supplied from the measurement unit 101 and supplies the direction information obtained as a result of the estimation to the communication unit 103 and the display method determination unit 104. Here, by using information such as the angular speed information, the acceleration information, or the like as the measured information, for example, the orientation (posture) of the head of the user 11-1 can be estimated.

The communication unit 103 includes, for example, a communication module or the like compliant to wireless communication such as a wireless Local Area Network (LAN), cellular communication (for example, LTE-Advanced, 5G, or the like), or the Bluetooth (registered trademark) or wired communication such as the Ethernet (registered trademark).

The communication unit 103 transmits the position information and the direction information of the user 11-1 supplied from the position estimation unit 102 to the position sharing server 20 via the network 50. Furthermore, the communication unit 103 receives the position information and the direction information of the other users 11-2 to 11-N transmitted from the position sharing server 20 via the network 50 and supplies the received information to the display method determination unit 104.

The position information and the direction information of the user 11-1 from the position estimation unit 102 and the position information and the direction information of the other users 11-2 to 11-N from the communication unit 103 are supplied to the display method determination unit 104. The display method determination unit 104 determines a method of displaying the virtual object $O_V$ on the basis of the position information and the direction information of the user 11-1 and the position information and the direction information of the other users 11-2 to 11-N.

Figure 4:
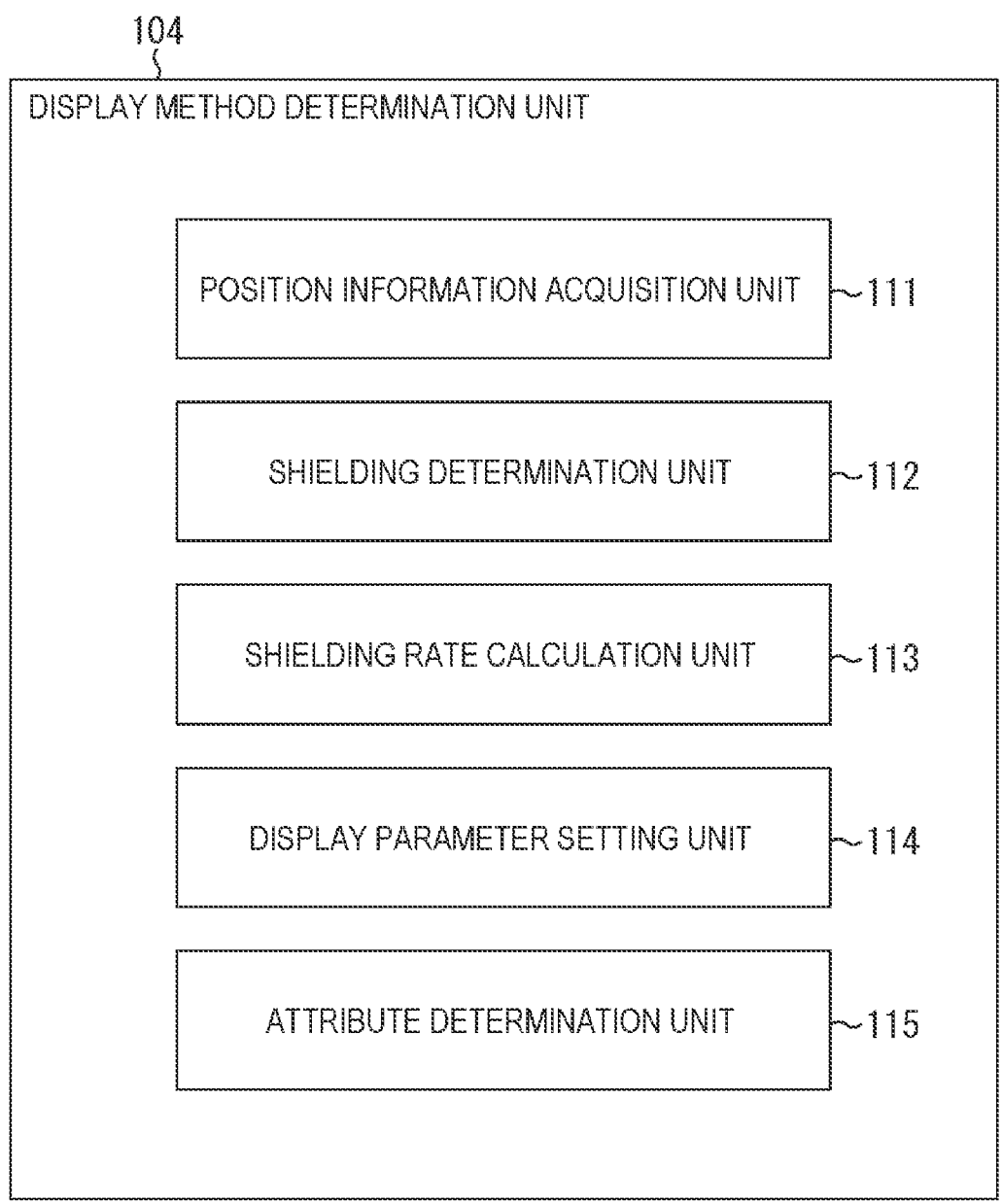
FIG. 4 is a block diagram illustrating an example of a detailed configuration of a display method determination unit.

Here, FIG. 4 illustrates a detailed configuration of the display method determination unit 104. In FIG. 4, the display method determination unit 104 includes a position information acquisition unit 111, a shielding determination unit 112, a shielding rate calculation unit 113, a display parameter setting unit 114, and an attribute determination unit 115.

The position information acquisition unit 111 acquires the position information and the direction information of the user 11-1 estimated by the position estimation unit 102 or the position information and the direction information of the other users 11-2 to 11-N received by the communication unit 103 and supplies the acquired information to the shielding determination unit 112, the shielding rate calculation unit 113, and the display parameter setting unit 114.

The shielding determination unit 112 determines whether or not the virtual object $O_V$ is hidden by the real object $O_R$ on the basis of information such as the position information and the direction information supplied from the position information acquisition unit 111 and supplies the determination result to the shielding rate calculation unit 113 and the display parameter setting unit 114. Here, the degree of shielding of the real object $O_R$ with respect to the virtual object $O_V$ is determined. However, the degree of shielding is not limited to the degree of shielding when the object is actually hidden, and may include the degree of shielding when the object may be hidden.

When the determination result supplied from the shielding determination unit 112 indicates that the shielding is performed, the shielding rate calculation unit 113 calculates a shielding rate (shielding degree) of the real object $O_R$ with respect to the virtual object $O_V$ on the basis of the information such as the position information and the direction information supplied from the position information acquisition unit 111 and supplies the calculation result to the display parameter setting unit 114.

The display parameter setting unit 114 generates a display parameter on the basis of the information such as the position information and the direction information supplied from the position information acquisition unit 111, the determination result regarding shielding supplied from the shielding determination unit 112, and the calculation result of the shielding rate from the shielding rate calculation unit 113 and supplies (set) the display parameter to the display control unit 105.

The attribute determination unit 115 confirms an attribute of the virtual object $O_V$, determines whether or not the virtual object $O_V$ is associated with a specific position in the real world, and supplies the determination result to the display parameter setting unit 114. At this time, when generating the display parameter, the display parameter setting unit 114 uses the determination result supplied from the attribute determination unit 115.

Returning to FIG. 3, the display control unit 105 performs control to display information regarding the virtual object $O_V$ or the like on the display unit 106 on the basis of the display parameter supplied from the display method determination unit 104. Note that the display control unit 105 may generate the display parameter by including the position information acquisition unit 111 to the attribute determination unit 115 (FIG. 4).

The display unit 106 includes, for example, a display device (display) such as a Liquid Crystal Display (LCD), an Organic Light Emitting Diode (OLED), a projector, or the like. The display unit 106 displays the information regarding the virtual object $O_V$ or the like (video or image including the same) according to the control from the display control unit 105.

Note that, in the client terminal 10-1, the position estimation unit 102, the display method determination unit 104, or the display control unit 105 may be implemented by executing a program by a processor (CPU 1001 in FIG. 20) such as a Central Processing Unit (CPU) or may be implemented by dedicated hardware.

Furthermore, in FIG. 3, minimum components of the client terminal 10-1 are illustrated. However, for example, other components such as a voice output device (for example, speaker, earphone, or the like) used to output voice regarding the virtual object $O_V$ may be added.

(Configuration of Position Sharing Server)

Furthermore, FIG. 3 illustrates an example of a configuration of the position sharing server 20 in FIG. 1.

In FIG. 3, the position sharing server 20 includes a control unit 201 and a communication unit 202.

The control unit 201 includes, for example, a processor such as a CPU and functions as a central processing apparatus that controls an operation of each unit and executes various arithmetic processing.

The communication unit 202 includes a communication module or the like compliant to wireless communication or wired communication.

The communication unit 202 receives the position information and the direction information transmitted from the client terminal 10-1 via the network 50 according to the control from the control unit 201 and transmits the received information to each of the client terminals 10-2 to 10-N via the network 50.

Furthermore, the communication unit 202 receives the position information and the direction information transmitted from the client terminals 10-2 to 10-N via the network 50 according to the control from the control unit 201 and transmits the received information to the client terminal 10-1 via the network 50.

Note that, because the client terminals 10-2 to 10-N are similarly configured to the client terminal 10-1 in FIG. 3, detailed description here is omitted.

(Problems and Solutions when Virtual Object $O_V$ is Shielded)

Various AR services can be provided by using the augmented reality system to which the technology according to the present disclosure is applied. However, here, as an AR service, for example, an AR game that is a game, using augmented reality (AR), played by a plurality of users 11 in cooperation with each other will be described as an example.

For example, in the AR game, there is a case where the virtual object $O_V$ is superimposed and displayed on the real world in accordance with a progress of cooperative play by the plurality of users 11-1 to 11-N respectively wearing the client terminals 10-1 to 10-N.

In such a case, in order to reduce uncomfortable feeling when the virtual object $O_V$ is superimposed and displayed on the real world or give a clue regarding the depth to the user 11, there is a case where shielding processing of shielding the virtual object $O_V$ (for example, display object 12 such as character, item, or the like of AR game) by the real object $O_R$ (for example, other user 11 or the like) is executed.

By executing such shielding processing, while it is possible to reduce the uncomfortable feeling and give a clue regarding the depth, the virtual object $O_V$ is shielded by the real object $O_R$. Therefore, there is a possibility that the user 11 cannot see the virtual object $O_V$ according to the shielding situation.

Figure 5:
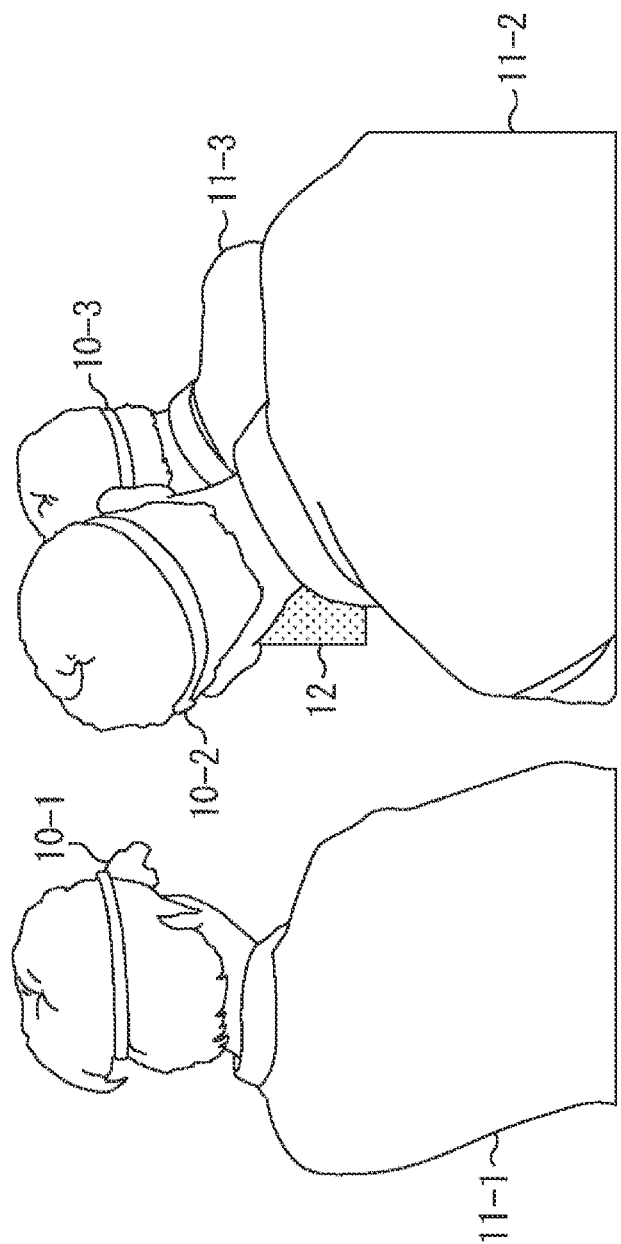
FIG. 5 is a diagram illustrating an example of shielding a virtual object when the augmented reality system is used by a plurality of users.

Here, in FIG. 5, a scene in which the plurality of users 11 cooperatively plays the AR game is illustrated. Note that FIG. 5 is a field of view of the user 11-4 positioned behind the users 11-1 to 11-3 when the four users including the users 11-1 to 11-4 use the same AR service as respectively wearing the client terminals 10-1 to 10-4.

In FIG. 5, in the middle of the progress of the AR game, the display object 12 such as characters, items, or the like is displayed. However, most of the display object 12 is shielded by the users 11-2 and 11-3. Therefore, from the user 11-4 positioned behind the users 11-2 and 11-3, the display object 12 is shielded by the users 11-2 and 11-3, and the user 11-4 can only visually recognize a part of the display object 12 (small part on lower left side in FIG. 5).

In this way, according to the current technology, because there is a possibility that the virtual object $O_V$ is excessively shielded and cannot be visually recognized depending on the situation (positional relationship with surrounding real object $O_R$), it is required to ensure visibility when the virtual object $O_V$ is shielded by the real object $O_R$. Therefore, regarding the augmented reality system to which the technology according to the present disclosure is applied, a technology of achieving shielding of the virtual object $O_V$ and ensuring the visibility when the virtual object $O_V$ is shielded by the real object $O_R$ is proposed.

Note that the shielding processing according to the technology of the present disclosure may be assumed as processing of displaying the virtual object $O_V$ as if the virtual object $O_V$ was hidden by the real object $O_R$. More specifically, the shielding processing may be assumed as processing of not displaying a part of the virtual object $O_V$ on the basis of a shape of the real object $O_R$ disposed in front of the virtual object $O_V$ as viewed from the user. In other words, as a result of such non-display processing, a part of the virtual object $O_V$ that overlaps with the real object $O_R$ is cut. Such display processing of the virtual object $O_V$ may be referred to as "occlusion" in the field of the augmented reality technology.

Figure 6A:
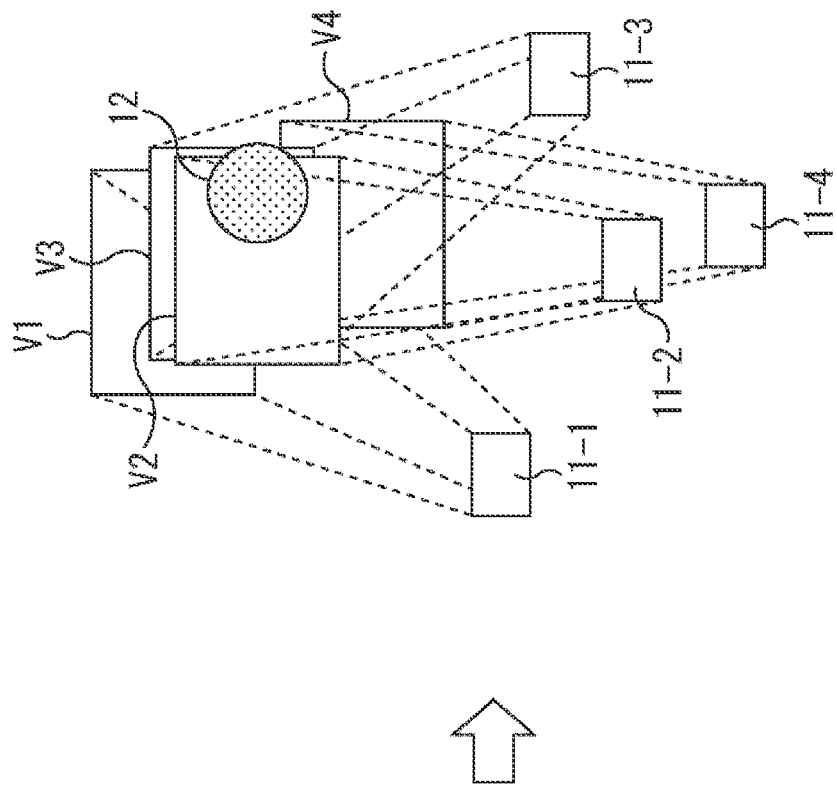
FIGS. 6A and 6B are time-series diagrams illustrating a state of a virtual object hidden by a real object.
Figure 6B:
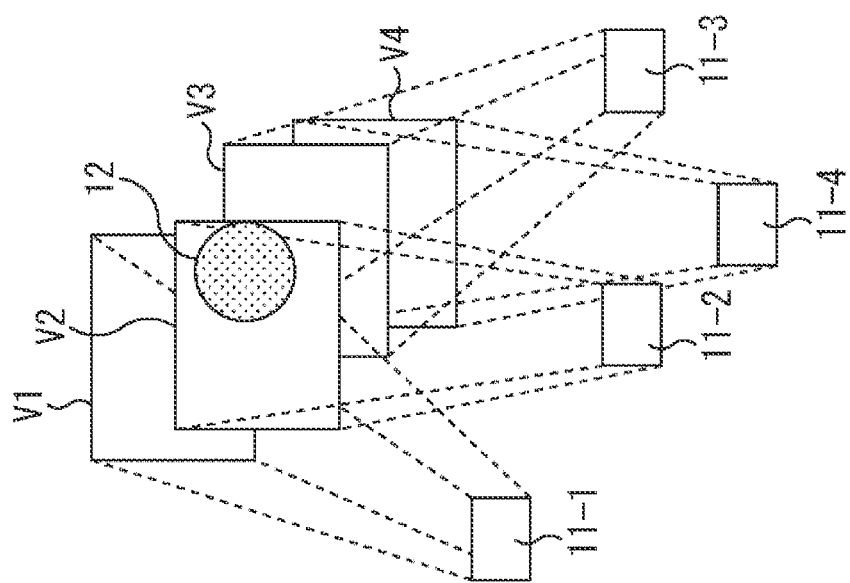

FIGS. 6A and 6B illustrate a state of the display object 12 that may be shielded by the other user 11 in time series. Note that, FIG. 6A schematically illustrates a field of view of each user 11 at a certain time t11, and FIG. 6B schematically illustrates a field of view of each user 11 at a time t12 subsequent to the time t11.

In FIG. 6A, fields of view V1 to V4 of the respective users 11-1 to 11-4 contain most of the display object 12 and are not shielded by the other user 11. Therefore, at the time t11, the users 11-1 to 11-4 can visually recognize the display object 12.

On the other hand, in FIG. 6B, although the fields of view V1 to V4 of the respective users 11-1 to 11-4 contain most or a part of the display object 12, a part of the field of view of the user 11 is shielded by a part of the other user 11. More specifically, for example, the field of view V4 of the user 11-4 contains the user 11-2 who exists in front of the user 11-4. Therefore, at the time t12, not all the users 11-1 to 11-4 cannot visually recognize the display object 12.

In this way, when the number of real objects $O_R$ that may hide the virtual object $O_V$ is large (for example, four users), even if a part of the virtual object $O_V$ that can be seen at a certain time (for example, time t11) is large, there is a high possibility that the virtual object $O_V$ is hidden in the future (for example, time t12).

Therefore, in the augmented reality system to which the technology according to the present disclosure is applied, on the basis of the number of real objects $O_R$ hiding the virtual object $O_V$ and a degree of shielding such as the shielding rate (shielding rate), the virtual object $O_V$ is displayed at (moved to) a position where all the users 11-1 to 11-4 can see the virtual object $O_V$.

FIG. 7 illustrates a first example of a display position of the virtual object $O_V$ shielded by the real object $O_R$. In FIG. 7, although a timing when the display object 12 is displayed comes in the middle of the progress of the AR game, if the display object 12 is displayed at a default position, the display object 12 is shielded by two users (other users 11-1 and 11-2) from the user 11-4 as indicated by a dotted frame in FIG. 7.

Therefore, in FIG. 7, the display object 12 is moved to a position above the default position by a predetermined distance as indicated by an arrow in FIG. 7 and is displayed at the position where all the users 11-1 to 11-4 can visually recognize the display object 12. With this operation, when the virtual object $O_V$ is displayed, as in a case where the shielding processing is executed, it is possible to reduce the uncomfortable feeling and give a clue regarding the depth by the real object $O_R$ (other users 11-1 to 11-3), and it is possible to ensure the visibility of the virtual object $O_V$.

Figure 8:
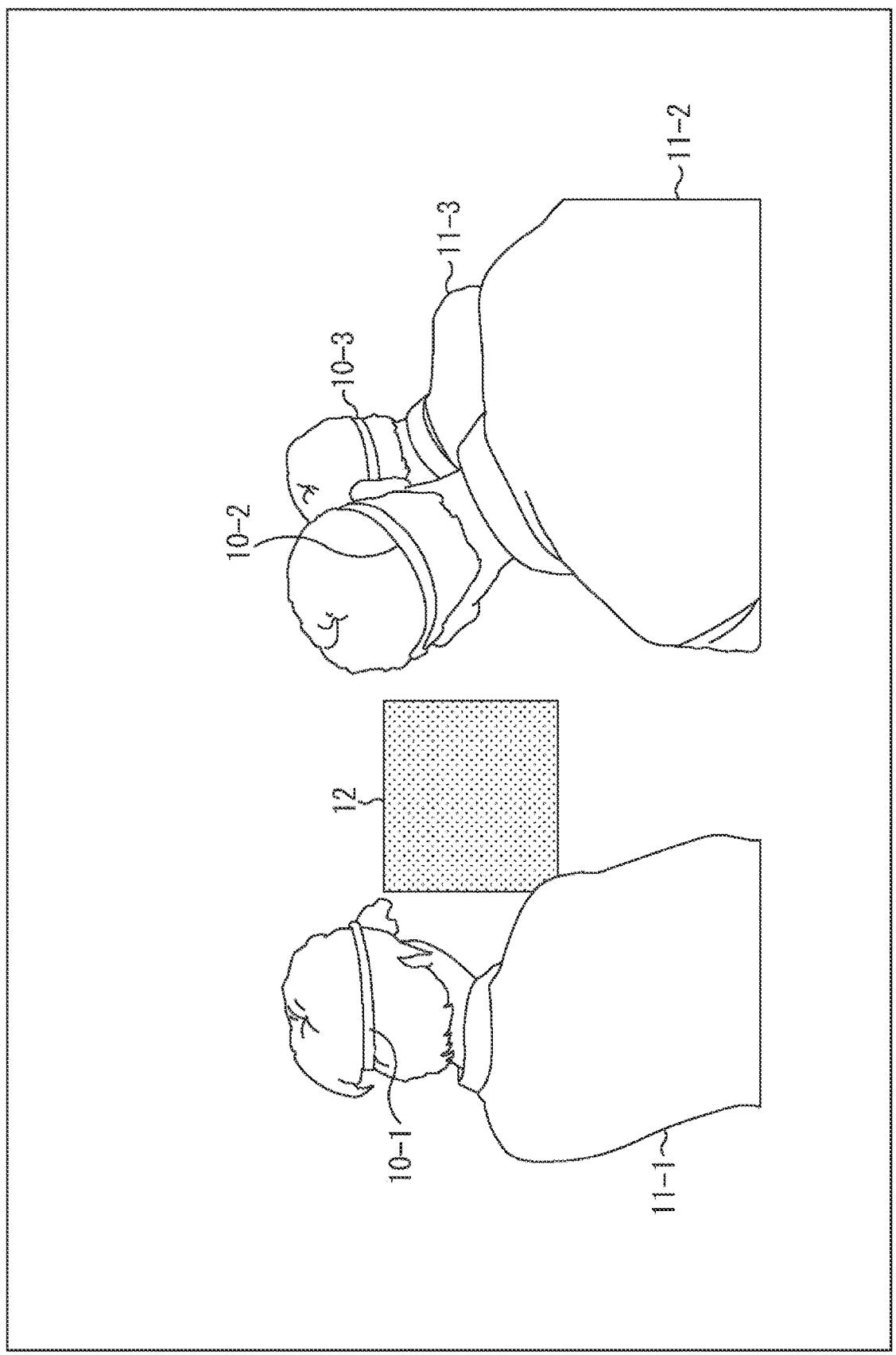
FIG. 8 is a diagram illustrating a second example of the display position of the shielded virtual object.

Furthermore, FIG. 8 illustrates a second example of the display position of the virtual object $O_V$ shielded by the real object $O_R$. In FIG. 8, when the display object 12 is displayed at the default position at a timing of displaying the display object 12, a part of the display object 12 (small part on lower left side in FIG. 8) is shielded by the single user (other user 11-1) from the user 11-4.

In this case, even if the display object 12 is displayed at the default position, the users 11-1 to 11-3 can visually recognize the entire display object 12. Although it is not possible for the user 11-4 to visually recognize the small part on the lower left side of the display object 12, the user 11-4 can visually recognize most of the display object 12. Therefore, it is possible to recognize content, a state, or the like of the display object 12.

Therefore, in FIG. 8, the display object 12 is displayed at the default position and is displayed at the position where all the users 11-1 to 11-4 can visually recognize the display object 12. With this operation, when the virtual object $O_V$ is displayed, it is possible to reduce the uncomfortable feeling and give a clue regarding the depth by the real object $O_R$, and it is possible to ensure the visibility of the virtual object $O_V$.

Note that, in FIG. 8, it has been described that the display object 12 is displayed at the default position. However, the display object 12 may be moved from the default position to the right by a predetermined distance and be displayed at the position where all the users 11 including the user 11-4 can visually recognize the complete display object 12.

Here, when the state illustrated in the second example in FIG. 8 is compared with the state illustrated in the first example in FIG. 7, in the state (first state) illustrated in the second example in FIG. 8, it is determined that the virtual object $O_V$ (display object 12) is hidden by at least one real object $O_R$ (one user: other user 11-1), and the virtual object $O_V$ (display object 12) is displayed by using the display parameter (first display parameter) associated with the display position (default position or position away from default position to right side by predetermined distance) of the virtual object $O_V$ (display object 12).

On the other hand, in the state (second state) illustrated in the first example in FIG. 7, it is determined that the virtual object $O_V$ (display object 12) is hidden by the real objects $O_R$ (two users: other users 11-1 and 11-2) more than that in the state (first state) illustrated in the second example in FIG. 8, and the virtual object $O_V$ (display object 12) is displayed by using the display parameter (second display parameter) associated with the display position (position away from default position to upper side by predetermined distance) of the virtual object $O_V$ (display object 12).

(Operation of Client Terminal) Next, an operation of the client terminal 10 described above will be described with reference to the flowcharts in FIGS. 9 and 10. Note that, here, as in the examples in FIGS. 5, 6A, 6B, 7, and 8, an example of an operation of the client terminal 10-4 worn by the user 11-4 among the users 11-1 to 11-4 who are playing the AR game in cooperation with each other will be described.

In the client terminal 10-4, a map is loaded (S11). That is, by generating three-dimensional map information (map) regarding surroundings of the images in advance on the basis of the plurality of captured images captured by the measurement unit 101 (camera thereof) in advance, the client terminal 10-4 can load a map (that is, internally generated map) corresponding to the current position.

In step S12, the position information acquisition unit 111 acquires the position information and the direction information of the user 11-4.

In step S13, the shielding determination unit 112 determines whether or not the virtual object $O_V$ such as the display object 12 is hidden by the real object $O_R$ (for example, furniture, buildings, or the like on map) other than the other users 11-1 to 11-3 on the basis of the situation such as the position, the direction, or the like of the user 11-4 on the loaded map.

When the determination processing in step S13 is affirmative ("YES" in S13), the procedure proceeds to step S14. In step S14, the shielding rate calculation unit 113 calculates a shielding rate of the real object $O_R$ that shields the virtual object $O_V$.

When the processing in step S14 ends, the procedure proceeds to step S15. Furthermore, when the determination processing in step S13 is negative ("NO" in S13), step S14 is skipped, and the procedure proceeds to step S15.

In step S15, the position information acquisition unit 111 acquires the position information and the direction information of the other users 11-1 to 11-3.

In step S16, the shielding determination unit 112 determines whether or not the virtual object $O_V$ such as the display object 12 is hidden by the other users 11-1 to 11-3 on the basis of the situation such the position, the direction, or the like of the users 11-1 to 11-3 on the loaded map.

When the determination processing in step S16 is affirmative ("YES" in S16), the procedure proceeds to step S17. In step S17, the display method determination unit 104 executes display method determination processing.

In this display method determination processing, a degree of shielding of the real object $O_R$ with respect to the virtual object $O_V$ is determined, and a display parameter corresponding to the determination result is set.

Here, the degree of shielding includes, for example, the number of other users 11-1 to 11-3 that exist between the display object 12 and the user 11-4 and hide the display object 12, a rate of a region of the display object 12 hidden by the other users 11-1 to 11-3 with respect to the entire display object 12 (shielding rate), or the like. Furthermore, here, the display parameter is associated with an attribute that is a display position of the display object 12.

Note that details of the display method determination processing will be described later with reference to the flowchart in FIG. 10.

When the processing in step S17 ends, the procedure proceeds to step S18. Furthermore, when the determination processing in step S16 is negative ("NO" in S16), step S17 is skipped, and the procedure proceeds to step S18.

In step S18, the display control unit 105 controls display of the virtual object $O_V$.

For example, in this display control processing, when the determination processing in step S13 is affirmative ("YES" in S13), the virtual object $O_V$ (display object 12) is displayed while being shielded by the real object $O_R$ (for example, real object $O_R$ such as furniture, buildings, or the like, other than other users 11-1 to 11-3) at a predetermined rate on the basis of the shielding rate calculated in the processing in step S14.

Furthermore, for example, in this display control processing, when the determination processing in step S16 is affirmative ("YES" in S16), the virtual object $O_V$ (display object 12) is displayed on the basis of the display parameter set in the processing in step S17.

When the processing in step S18 ends, the procedure proceeds to step S19. In step S19, it is determined whether or not to end the processing.

When the determination processing in step S19 is negative ("NO" in S19), the procedure returns to step S12, and the processing in steps S12 to S19 is repeated, and the display of the virtual object $O_V$ with respect to the real object $O_R$ is controlled. Furthermore, when the determination processing in step S19 is affirmative ("YES" in S19), the processing illustrated in FIG. 9 ends.

The operation of the client terminal 10 has been described above.

Note that, in the client terminal 10, a timing when the display of the virtual object $O_V$ is controlled is, for example, a timing when the virtual object $O_V$, which has been already displayed, is shielded by the real object $O_R$ in addition to a timing, for example, when the virtual object $O_V$ is superimposed and displayed on the real world.

(Flow of First Display Method Determination Processing)

Next, a flow of first display method determination processing corresponding to step S17 in FIG. 9 will be described with reference to the flowchart in FIG. 10.

In step S111, the shielding determination unit 112 determines whether or not the number of the other users 11 hiding the virtual object $O_V$ such as the display object 12 and the shielding rate are less than thresholds.

When the determination processing in step S111 is affirmative ("YES" in S111), the procedure proceeds to step S112. In step S112, the display parameter setting unit 114 sets a first display parameter used to display the virtual object $O_V$ at a first position where all the users can visually recognize the virtual object $O_V$.

Figure 9:
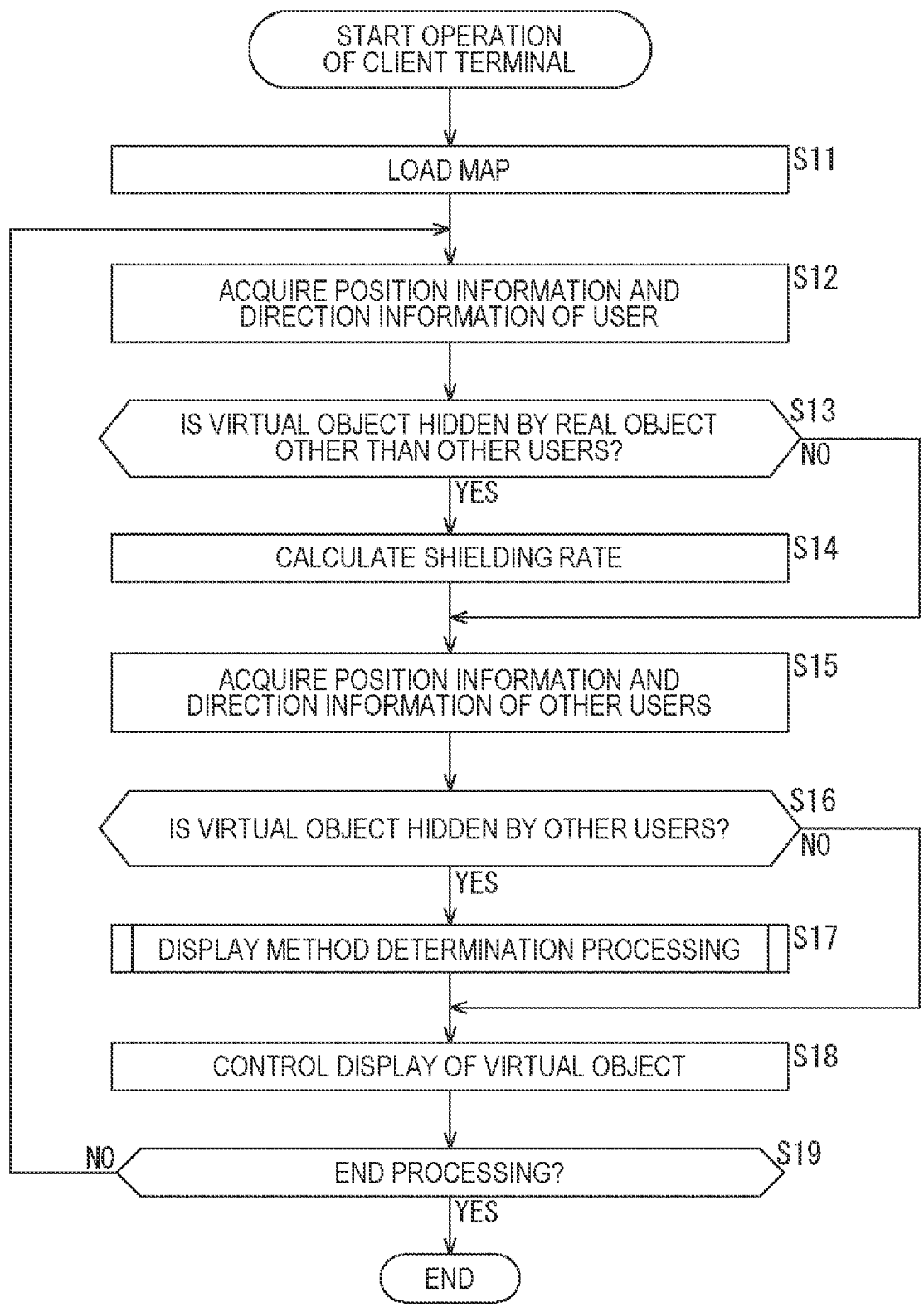
FIG. 9 is a flowchart for explaining an operation of a client terminal.
Figure 10:
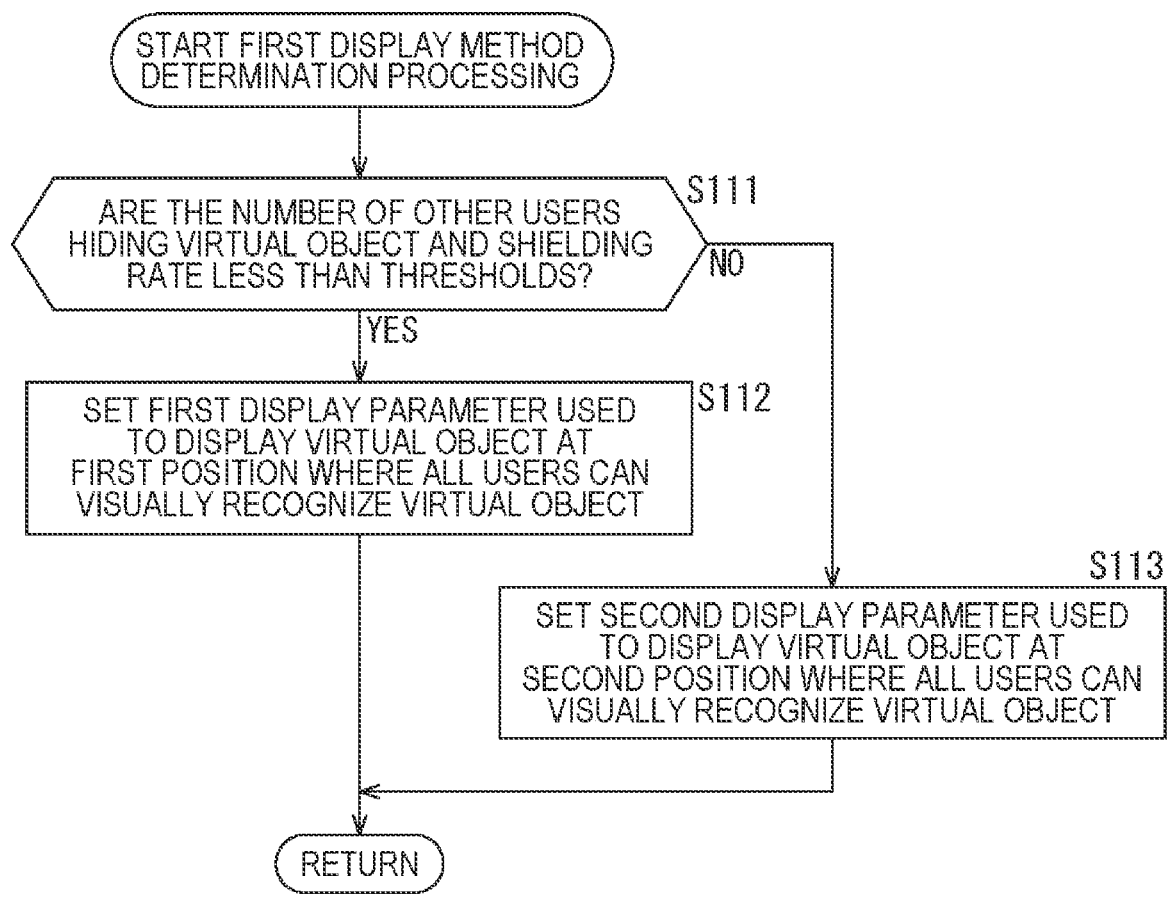
FIG. 10 is a flowchart for explaining a flow of first display method determination processing.

With this setting, for example, when the display object 12 is shielded by the single user (other user 11-1) and the shielding rate is less than a predetermined rate as illustrated in FIG. 8, the first display parameter used to display the display object 12 at the default position is set (S112 in FIG. 10), and the display object 12 is displayed at the first position where all the users 11-1 to 11-4 can be visually recognize the display object 12 (S18 in FIG. 9).

When the determination processing in step S111 is negative ("NO" in S111), the procedure proceeds to step S113. In step S113, the display parameter setting unit 114 sets a second display parameter used to display the virtual object $O_V$ at a second position where all the users can visually recognize virtual object $O_V$.

With this setting, for example, when the display object 12 is shielded by the two users (other users 11-1 and 11-2) and the shielding rate is equal to or more than a predetermined rate as illustrated in FIG. 7, the second display parameter used to move the display object 12 to the second position above the default position (change display position) is set (S113 in FIG. 10), and the display object 12 is displayed at the second position where all the users 11-1 to 11-4 can visually recognize the display object 12 (S18 in FIG. 9).

When the processing in step S112 or S113 ends, the procedure returns to step S17 in FIG. 9, and the processing in step S17 and subsequent steps is executed.

In this way, in the first display method determination processing, when the degree of shielding is determined, in the first state (state illustrated in second example in FIG. 8) where it is determined that the virtual object $O_V$ (display object 12) is hidden by at least a single real object $O_R$ (one user: other user 11-1), the virtual object $O_V$ (display object 12) is displayed by using the first display parameter (parameter used for display at first display position).

On the other hand, in the first display method determination processing, when the degree of shielding is determined, in the second state (state illustrated in first example in FIG. 7) where it is determined that the virtual object $O_V$ (display object 12) is hidden by the real objects $O_R$ (two users: other users 11-1 and 11-2) more than that in the first state, the virtual object $O_V$ (display object 12) is displayed by using the second display parameter (parameter used for display at second display position).

Note that, in the first display method determination processing, when the degree of shielding is determined in the determination processing in step S111, the number of other users hiding the virtual object $O_V$ and the shielding rate are included in determination targets. However, it is possible that the shielding rate is not included in the determination target. Furthermore, if the number of other users 11 hiding the virtual object $O_V$ is included in the determination target regarding the degree of shielding, another index representing the degree of shielding may be used. Furthermore, the threshold to be a determination criterion can be appropriately adjusted, for example, according to content, a scene, or the like of the AR service.

As described above, in the first embodiment, the display parameter associated with the display position of the virtual object $O_V$ is changed according to the number of real objects $O_R$ shielding the virtual object $O_V$ and the virtual object $O_V$ is displayed at the position where all the users can visibility recognize the virtual object $O_V$ so that the visibility at the time when the virtual object $O_V$ is shielded is ensured. In particular, when the client terminal 10 is a mobile terminal, a display region of a display device (display) is narrow. However, by changing the display position of the virtual object $O_V$ according to the number of real objects $O_R$ shielding the virtual object $O_V$, the visibility of the virtual object $O_V$ can be ensured.

2. Second Embodiment

By the way, some virtual objects $O_V$ are associated with a specific position in the real world, and some virtual objects $O_V$ are not associated with the specific position in the real world. Here, if the virtual object $O_V$ is moved to a position where the virtual object $O_V$ can be visually recognized when the virtual object $O_V$ is associated with the real world, the movement may be unnatural.

Therefore, the augmented reality system to which the technology according to the present disclosure is applied has the following configuration in order to enable visibility of the virtual object $O_V$ at the time of being shielded by a real object $O_R$ to be ensured when the virtual object $O_V$ is associated with the real world.

That is, in the augmented reality system to which the technology according to the present disclosure is applied, a transmittance of a color of the virtual object $O_V$ is changed on the basis of a degree of shielding such as the number of real objects $O_R$ hiding the virtual object $O_V$ or a shielded rate (shielding rate).

Figure 11:
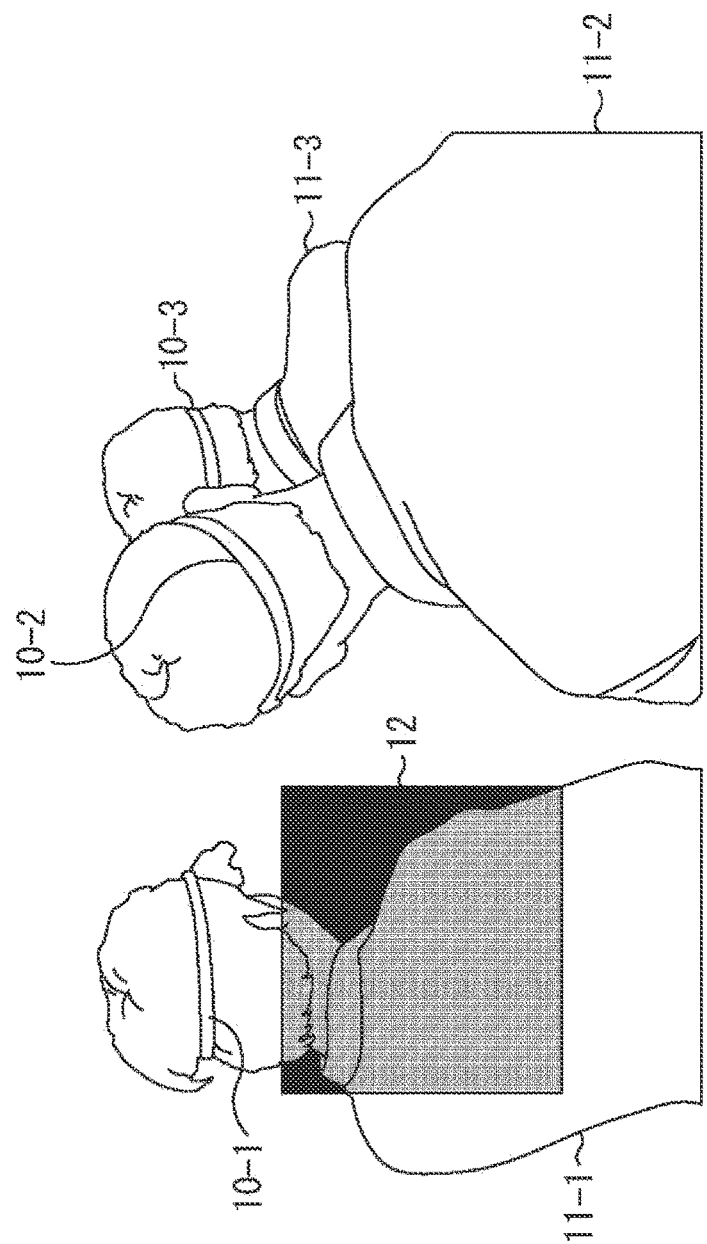
FIG. 11 is a diagram illustrating a first example of a transmittance of a color of the shielded virtual object.

FIG. 11 illustrates a first example of the transmittance of the color of the virtual object $O_V$ shielded by the real object $O_R$. In FIG. 11, although a timing when a display object 12 is displayed comes in the middle of progress of an AR game, if the display object 12 is displayed with a default color, most of the display object 12 is shielded by a single user (other user 11-1) from a user 11-4.

Therefore, in FIG. 11, the transmittance of the color of the display object 12 is changed, and the display object 12 (part thereof) is overlapped with the other user 11-1 (part thereof) and is displayed. With this operation, when the virtual object $O_V$ is displayed, as in a case where the shielding processing is executed, it is possible to reduce the uncomfortable feeling and give a clue regarding the depth by the real object $O_R$ (other users 11-1 to 11-3), and it is possible to ensure the visibility of the virtual object $O_V$.

Figure 12:
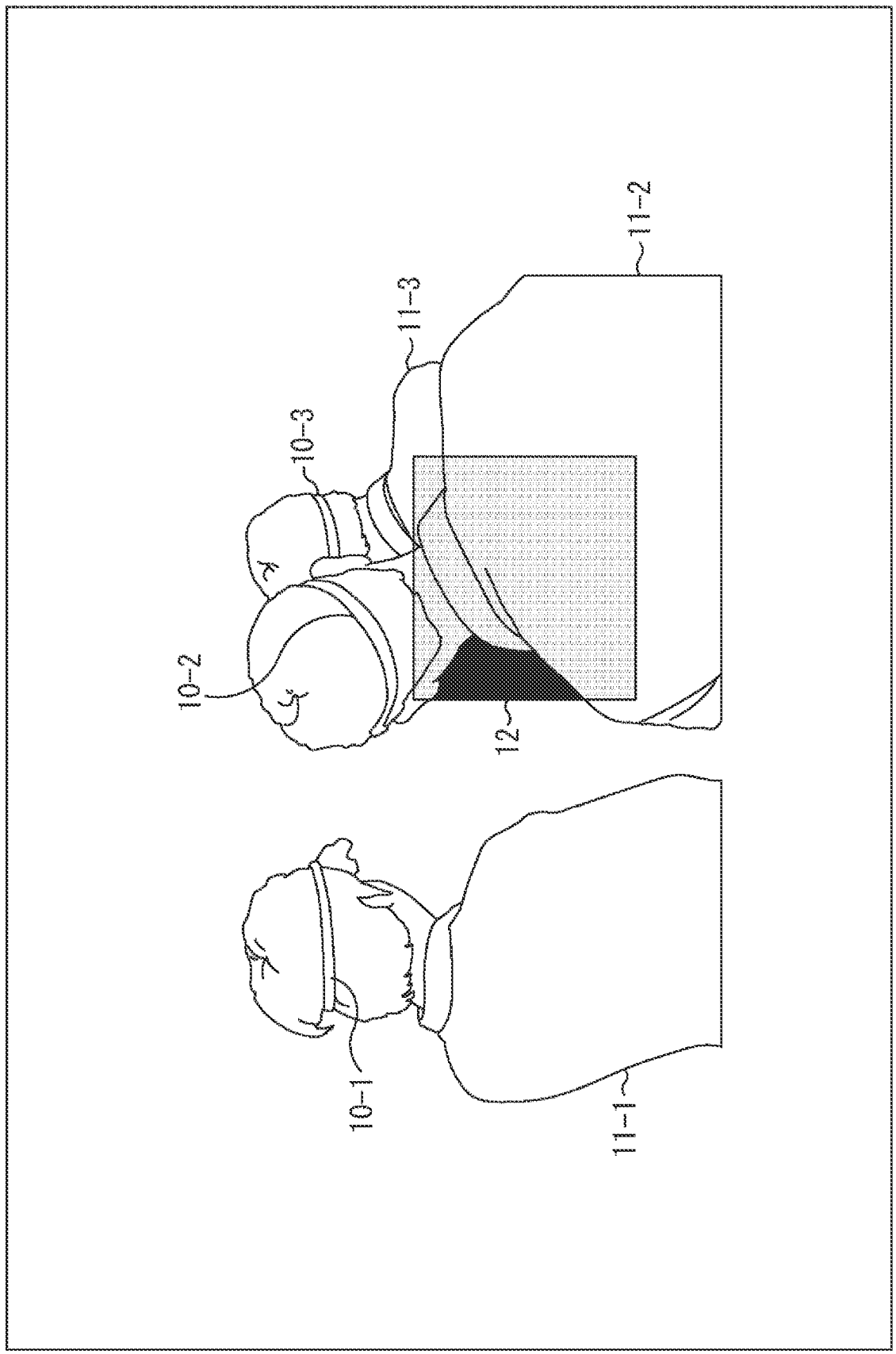
FIG. 12 is a diagram illustrating a second example of the transmittance of the color of the shielded virtual object.

Furthermore, FIG. 12 illustrates a second example of the transmittance of the color of the virtual object $O_V$ shielded by the real object $O_R$. In FIG. 12, if the display object 12 is displayed with a default color at a display timing of the display object 12, most of the display object 12 is shielded by two users (other users 11-2 and 11-3) from the user 11-4.

Therefore, in FIG. 12, the transmittance of the color of the display object 12 is changed, and the display object 12 (part thereof) is overlapped with the other users 11-2 and 11-3 (part thereof) and is displayed. With this operation, when the virtual object $O_V$ is displayed, it is possible to reduce the uncomfortable feeling and give a clue regarding the depth by the real object $O_R$, and it is possible to ensure the visibility of the virtual object $O_V$.

However, the transmittance (second transmittance) of the color of the display object 12 superimposed on the two users (other users 11-2 and 11-3) in FIG. 12 is higher than the transmittance (first transmittance) of the color of the display object 12 superimposed on the single user (other user 11-1) in FIG. 11, and the back of the two users (other users 11-2 and 11-3) shielding the display object 12 can be relatively clearly seen. In other words, the first transmittance (FIG. 11) is lower than the second transmittance (FIG. 12), and it can be said that the back of the single user (other user 11-1) shielding the display object 12 is slightly blurredly seen.

More specifically, the first transmittance (FIG. 11) and the second transmittance (FIG. 12) are higher than zero % and lower than 100% when it is assumed that complete transmission be 100% and complete opacity is zero %. Furthermore, in this case, the first transmittance (for example, transmittance 40%) is lower than the second transmittance (for example, transmittance 60%).

Figure 13:
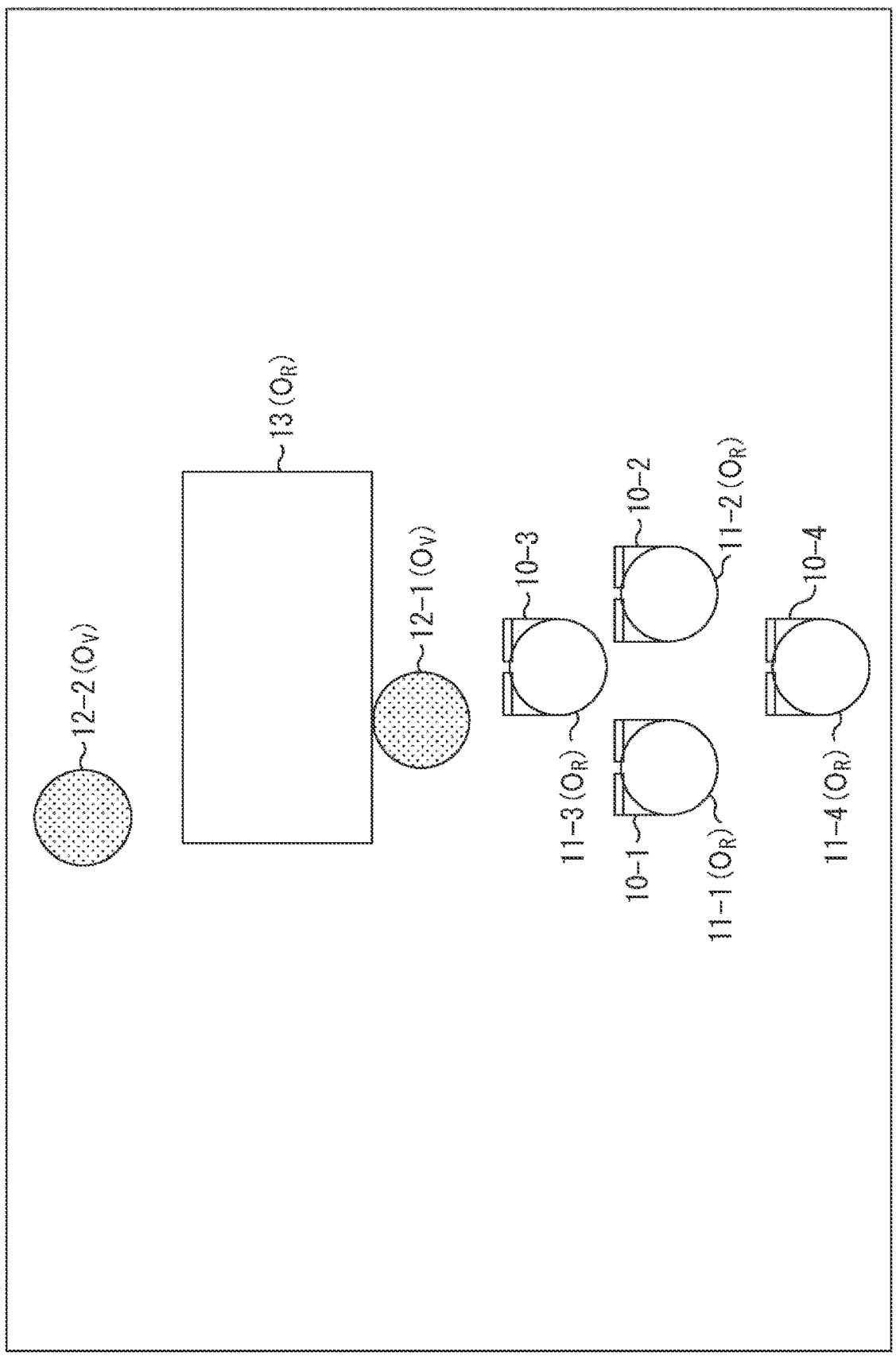
FIG. 13 is a diagram illustrating an example of arrangement of users and objects when the transmittance of the color of the shielded virtual object is changed.

Furthermore, at this time, for example, when a real object 13 (for example, real object $O_R$ fixed to real space such as furniture, buildings, or the like) other than the other users 11-1 to 11-3 exists as the real object $O_R$ as illustrated in FIG. 13, it can be determined whether or not the display object 12 is shielded by the real object $O_R$ depending on whether or not the real object $O_R$ is the other users 11-1 to 11-3 or the real object 13. Note that, in the present disclosure, there is a case where the real object 13 is referred to as a static real object 13.

For example, when a display object 12-1 exists between the other users 11-1 to 11-3 and the static real object 13, the display object 12-1 is not completely shielded by the other users 11-1 to 11-3, and the display object 12-1 is displayed at the transmittance of the color according to the degree of shielding (the number of users 11 shielding the display object 12-1 or the like).

On the other hand, for example, when a display object 12-2 exists behind the static real object 13, the static real object 13 completely shields the display object 12-2 (set transmittance to zero %), and a part of the display object 12-2 can be seen or the entire display object 12-2 cannot be seen from the users 11-1 to 11-4 according to the shielding rate.

In this way, in the AR game, even if the virtual object $O_V$ is behind the other user 11 who performs cooperative play, the virtual object $O_V$ is not completely shielded. However, when the virtual object $O_V$ is shielded by the static real object 13 other than the other user 11 who performs cooperative play, the virtual object $O_V$ is shielded, and the shielded part cannot be completely seen from each user 11. In other words, while the virtual object $O_V$ is completely shielded by the static real object 13, for example, furniture, buildings, or the like, a display state of the virtual object $O_V$ is changed and the virtual object $O_V$ is not completely shielded by the user 11 that is a dynamic object.

More specifically, it is determined whether the real object $O_R$ in the real space is a static object or a dynamic object. Here, the real object $O_R$ that is determined as a dynamic object is continuously tracked by the augmented reality system to which the technology according to the present disclosure is applied, and processing of shielding the virtual object $O_V$ by the dynamic object is prevented or inhibited. As a result, the shielding processing can be simplified, and a processing load of a processor or the like can be lowered. Note that the prevention and the inhibition of the shielding processing in the technology according to the present disclosure will be described later in detail.

(Flow of Second Display Method Determination Processing)

Next, an operation of a client terminal 10 will be described. In the second embodiment, although the processing of the flowchart illustrated in FIG. 9 is executed as in the first embodiment, processing content of the display method determination processing in step S17 in FIG. 9 is different.

Figure 14:
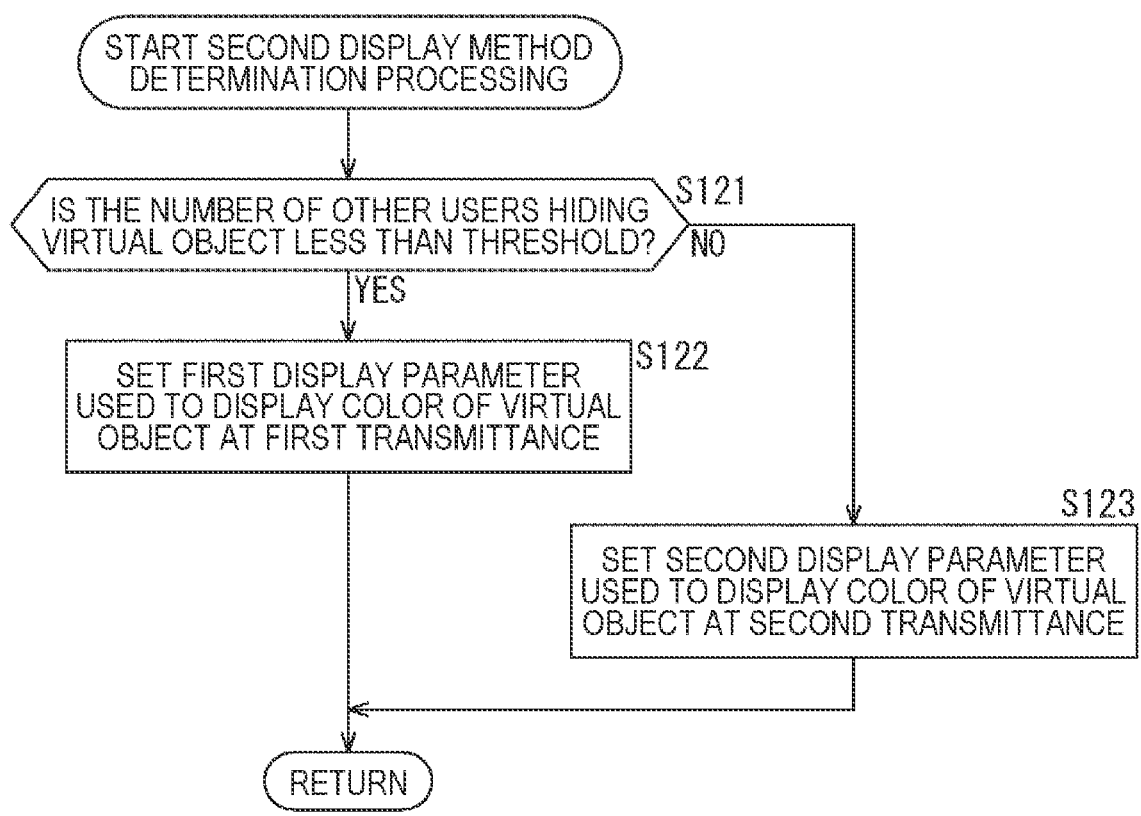
FIG. 14 is a flowchart for explaining a flow of second display method determination processing.

Therefore, here, a flow of the second display method determination processing corresponding to step S17 in FIG. 9 will be described with reference to the flowchart in FIG. 14. Furthermore, here, a display parameter is associated with an attribute that is the transmittance of the display object 12.

In step S121, a shielding determination unit 112 determines whether or not the number of the other users 11 hiding the virtual object $O_V$ such as the display object 12 is less than a threshold.

When the determination processing in step S121 is affirmative ("YES" in S121), the procedure proceeds to step S122. In step S122, a display parameter setting unit 114 sets a first display parameter used to display the color of the virtual object $O_V$ at the first transmittance.

With this setting, for example, when the display object 12 is shielded by the single other user 11-1 and the number is less than a threshold as illustrated in FIG. 11, the first display parameter used to display the color of the display object 12 at the first transmittance (for example, transmittance 40%) lower than the second transmittance (for example, transmittance 60%) is set, and the display object 12 is displayed at the default position so that the transmittance of the color of a part shielded by the other user 11-1 is set to the first transmittance (for example, transmittance 40%).

When the determination processing in step S121 is negative ("NO" in S121), the procedure proceeds to step S123. In step S123, the display parameter setting unit 114 sets a second display parameter used to display the color of the virtual object $O_V$ at the second transmittance.

With this setting, for example, when the display object 12 is shielded by the two other users 11-2 and 11-3 and the number is equal to or more than the threshold as illustrated in FIG. 12, the second parameter used to display the color of the display object 12 at the second transmittance (for example transmittance 60%) higher than the first transmittance (for example, transmittance 40%) is set, and the display object 12 is displayed at the default position so that the transmittance of the color of a part shielded by the other users 11-2 and 11-3 is set to the second transmittance (for example, transmittance 60%).

When the processing in step S122 or S123 ends, the procedure returns to step S17 in FIG. 9, and the processing in step S17 and subsequent steps is executed.

In this way, in the second display method determination processing, when a degree of shielding is determined, the number of real objects $O_R$ (other user 11) hiding the virtual object $O_V$ (display object 12) is used for determination and is compared with the threshold to be a determination criterion. While the first display parameter (first transmittance) is set when the number of other users 11 is less than the threshold, the second display parameter (second transmittance) is set when the number of other users 11 is equal to or more than the threshold.

Note that the threshold to be the determination criterion can be appropriately adjusted, for example, according to content, a scene, or the like of an AR service. Furthermore, here, one threshold is used as the determination criterion. However, for example, when display parameters according to three or more transmittances can be set, for example, a plurality of thresholds such as a first threshold, a second threshold, or the like may be used as determination criteria.

Moreover, here, a case where the number of other users 11 hiding the virtual object $O_V$ (display object 12) is used for a determination target of the degree of shielding has been described as an example. However, as long as the determination target includes the number of other users 11 hiding the virtual object $O_V$, the determination target may further include, for example, another index indicating a degree of shielding such as a shielding rate.

By the way, the first display method determination processing described in the first embodiment and the second display method determination processing described in the second embodiment may be selectively executed, and a flow of such processing will be described with reference to the flowchart in FIG. 15.

(Flow of Third Display Method Determination Processing)

Figure 15:
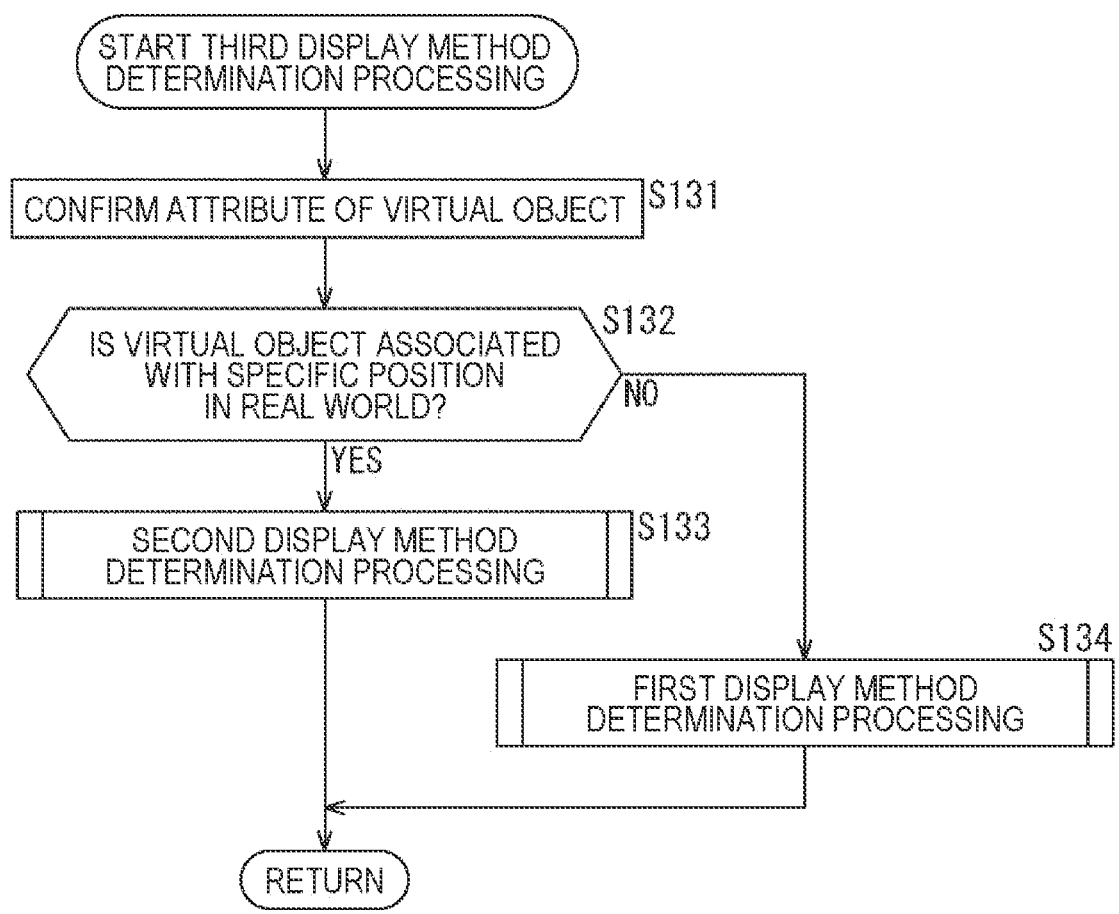
FIG. 15 is a flowchart for explaining a flow of third display method determination processing.

FIG. 15 is a flowchart for explaining a flow of third display method determination processing corresponding to step S17 in FIG. 9.

In step S131, an attribute determination unit 115 confirms an attribute of the virtual object $O_V$ to be displayed.

In step S132, the attribute determination unit 115 determines whether or not the virtual object $O_V$ is associated with a specific position in the real world on the basis of the confirmation result of the processing in step S131.

When the determination processing in step S132 is affirmative ("YES" in S132), the procedure proceeds to step S133. In step S133, the display method determination unit 104 executes the second display method determination processing (FIG. 14).

In the second display method determination processing, on the premise that the virtual object $O_V$ (display object 12) is an object (for example, plant, building, or the like displayed when AR game is played) fixed to a predetermined surface in the real world (real space) and is displayed at a default position, a display parameter used to display the virtual object $O_V$ at a transmittance of a color corresponding to the degree of shielding is set.

When the determination processing in step S132 is negative ("NO" in S132), the procedure proceeds to step S134. In step S134, the display method determination unit 104 executes the first display method determination processing (FIG. 10).

In the first display method determination processing, on the premise that the virtual object $O_V$ (display object 12) is an object (for example, message, symbol, or the like displayed when AR game is played) that is not fixed to a surface in the real world (real space) and can be displayed while being moved from the default position, the display parameter used to display the virtual object $O_V$ at the position according to the degree of shielding is set.

When the processing in step S133 or S134 ends, the procedure returns to step S17 in FIG. 9, and the processing in step S17 and subsequent steps is executed.

In this way, in the third display method determination processing, because the display method can be switched according to whether or not the virtual object $O_V$ is associated with the specific position in the real world, that is, whether or not the virtual object $O_V$ is the object fixed to the predetermined surface in the real world or whether or not the virtual object $O_V$ is an object that is not fixed to the surface in the real world, the virtual object $O_V$ can be more appropriately displayed, for example, according to the content, the scene, or the like of the AR service.

As described above, in the second embodiment, the display parameter associated with the transmittance of the virtual object $O_V$ (color thereof) is changed according to the number of real objects $O_R$ shielding the virtual object $O_V$ and the virtual object $O_V$ is displayed at the default position so that the visibility is ensured when the virtual object $O_V$ is shielded. In particular, when the client terminal 10 is a mobile terminal, a display region of a display device (display) is narrow. However, by changing the transmittance of the virtual object $O_V$ according to the number of real objects $O_R$ shielding the virtual object $O_V$, the visibility of the virtual object $O_V$ can be ensured.

Note that, in the first embodiment, a case where the display parameter is associated with the attribute that is the display position of the virtual object $O_V$ has been described, and in the second embodiment, a case where the display parameter is associated with the attribute that is the transmittance of the virtual object $O_V$ has been described. However, the display parameter may be associated with the attribute other than the display position and the transmittance.

That is, the display parameter can be associated with at least one of attributes, for example, the display position of the virtual object $O_V$, the transmittance of the virtual object $O_V$ with respect to the real object $O_R$, a display posture of the virtual object $O_V$, a size of the virtual object $O_V$, and the color of the virtual object $O_V$. For example, when the display parameter is associated with the attribute such as the display posture or the size, the display posture or the size of the display object 12 is adjusted and displayed according to the degree of shielding such as the number of other users 11 hiding the display object 12.

In the first and second embodiments, the first state and the second state are determined after the virtual object $O_V$ is actually hidden by the real object $O_R$. Instead of these determinations, the first state and the second state may be determined before the virtual object $O_V$ is actually hidden by the real object $O_R$, that is, may be estimated. Such estimation may be made on the basis of the number of other users 11 existing between the user 11-4 and the display object 12, for example, in a direction connecting the user 11-4 and the display object 12 (depth direction). In this estimation, it is not necessary to consider a positional relationship between the users in a direction (horizontal direction) perpendicular to the depth direction when viewed from the user 11-4. According to such a configuration, a processing load applied to select the first display parameter and the second display parameter in the technology according to the present disclosure can be reduced. As a result, it is possible to more appropriately change a degree of application of shielding processing.

As a trigger to execute the estimation of the positional relationship between the users, for example, a result of the determination processing whether or not the other user 11 stays within a predetermined distance from the user 11-4 may be adopted. In this determination processing, the positional relationship between the users is substantially linearly determined, instead of planar determination. According to such determination processing, the positional relationship between the users is estimated at a higher speed, and whether the state is the first state or the second state can be estimated at a higher speed.

In the first and second embodiments, the first display parameter or the second display parameter is selected according to whether the positional relationship between the virtual object $O_V$ and the real object $O_R$ is in the first state or the second state. More specifically, the display method determination unit 104 (or display control unit 105) executes the shielding processing on the virtual object $O_V$ on the basis of the shape of the real object $O_R$ according to the first display parameter in the first state. On the other hand, the display method determination unit 104 (or display control unit 105) executes processing of displaying the virtual object $O_V$ on the basis of the second display parameter while preventing the shielding processing, in the second state.

That is, the display processing in the technology according to the present disclosure may be assumed as processing of determining whether or not to prevent the shielding processing on the virtual object $O_V$. The prevention of the shielding processing may include the inhibition of the shielding processing. According to such display processing, a processing load required for calculation of the positional relationship between objects for the shielding processing or processing of drawing the virtual object can be adaptively reduced. The prevention of the shielding processing may include reduction in recognition accuracy of the shape of the real object $O_R$ for the shielding processing and simplification of the shape of the recognized real object $O_R$. Note that, regardless of the prevention and the inhibition of the recognition of the real object $O_R$ for the shielding processing, a real space for Simultaneously Localization and Mapping (SLAM) processing related to self-position estimation of the user 11 may be recognized. The shielding processing may be prevented in combination with the estimation of the positional relationship between the users.

3. Modification

By the way, in the above description, an AR game played by a plurality of users in cooperation with each other has been described as an example of an AR service. However, by using the augmented reality system to which the technology according to the present disclosure is applied, various AR services can be provided. For example, in the augmented reality system to which the technology according to the present disclosure is applied, an AR navigation service of assisting movement of a user by the augmented reality (AR) can be provided as an AR service.

In this AR navigation service, for example, when a navigator (virtual object $O_V$) who is a humanoid navigator guides a user 11 wearing a client terminal 10 a route (route) to a destination, in a case where the navigator is hidden by the real object $O_R$ such as a corner, a building, or the like, display of the virtual object $O_V$ and the real object $O_R$ is controlled so as to recognize which real object $O_R$ hides the navigator.

(Configuration of Client Terminal And Map Providing Server)

Figure 16:
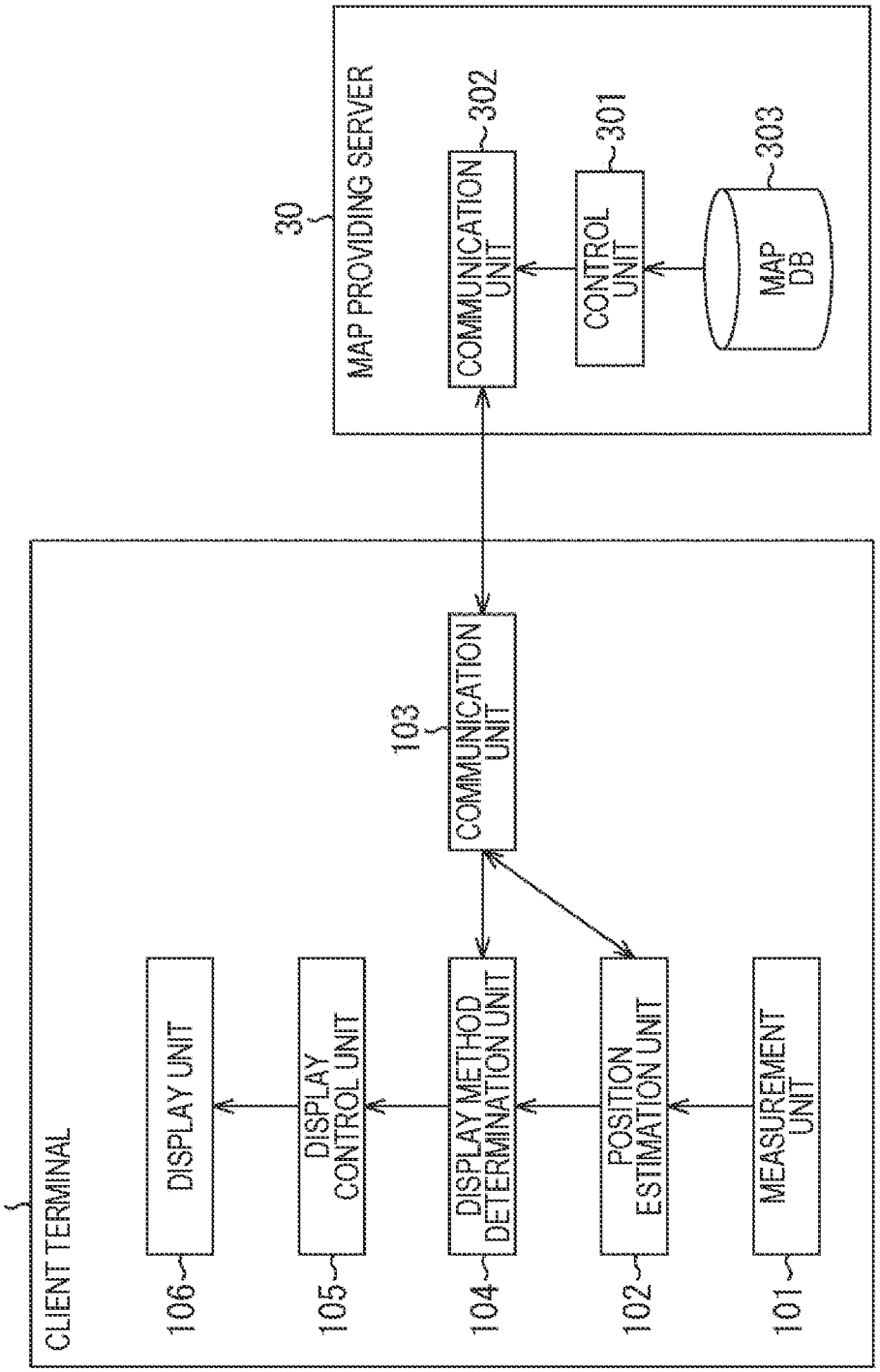
FIG. 16 is a block diagram illustrating an example of a configuration of the client terminal and a map providing server.

When the augmented reality system to which the technology according to the present disclosure is applied provides the AR navigation service, a map providing server 30 is provided instead of the position sharing server 20. FIG. 16 illustrates an example of configurations of the client terminal 10 and the map providing server 30.

In FIG. 16, the client terminal 10 includes the measurement unit 101 to the display unit 106 similarly to the client terminal 10 in FIG. 3. Note that the measurement unit 101 to the display unit 106 in FIG. 16 are different from the measurement unit 101 to the display unit 106 in FIG. 3 in content of display method determination processing executed by the display method determination unit 104, and the detailed content thereof will be described later.

Furthermore, in FIG. 16, the map providing server 30 includes a control unit 301, a communication unit 302, and a map DB 303.

The control unit 301 includes, for example, a processor such as a CPU and functions as a central processing apparatus that controls an operation of each unit and executes various arithmetic processing. The communication unit 302 includes a communication module or the like compliant to wireless communication or wired communication.

The map DB 303 is recorded in a storage device such as a hard disk and manages three-dimensional map information of various regions as a database.

In the map providing server 30 configured as described above, the communication unit 302 receives position information transmitted from the client terminal 10 via a network 50 according to control from the control unit 301 and transmits map information corresponding to the received position information to the client terminal 10 via the network 50.

(Example of AR Navigation Service) FIGS. 17A and 17B illustrate a scene in which the user 11 receives a guidance of a route to a destination by a navigator 14 who is a humanoid navigator by using the AR navigation service.

Here, FIGS. 17A and 17B are assumed as a field of view when the user 11 wearing the client terminal 10 views at an outdoor place, and the navigator 14 as the virtual object OV is displayed in the real world. Note that FIG. 17A illustrates a field of view of the user 11 at a time t21, and FIG. 17B illustrates a field of view of the user 11 at a time t22 subsequent to the time t21.

In FIG. 17A, in the field of view of the user 11, a real object 15 such as a road and buildings on the left and right thereof (real object OR existing on map) and the navigator 14 (virtual object OV) are seen. The navigator 14 guides the user 11 to a direction of the destination by using a message "Here".

Thereafter, when it is necessary to pass through a path between the buildings that are the real objects 15 as the route to the destination, this path is guided by the navigator 14.

At this time, as illustrated in FIG. 17B, in order to make the user 11 recognize which building hides the navigator 14, a target building among the real objects 15 is focused and displayed (for example, highlight). In the example in FIG. 17B, when the navigator 14 walks on the path between the right building on the front side and the adjacent building among the real objects 15, the front building is hidden and cannot be seen. Therefore, the front building is highlighted (display of dotted pattern in FIGS. 17A and 17B).

Furthermore, here, by changing the display of the navigator 14 shielded by the front building to the display before being shielded (change solid line in FIG. 17A to dotted line in FIG. 17B), it is possible to make the user 11 recognize that the navigator 14 exists in the shielded place.

Moreover, when the navigator 14 is shielded by a real object 16 in a case where the real object 16 such as a passer (real object OR that does not exist on map) enters the field of view of the user 11, the user 11 is made to recognize the state. In the example in FIG. 17B, three passers exist in front of the highlighted building and the navigator 14 is superimposed and displayed on the passers. Therefore, the user 11 can recognize that the navigator 14 is shielded by the passers.

In this way, because the client terminal 10 can recognize a relationship between the position of the user 11 and the position of the real object 15 such as a building that is the real object $O_R$ existing on the map by using the map information acquired from the map providing server 30, the real object 15 such as a target building can be focused and displayed.

Figure 18:
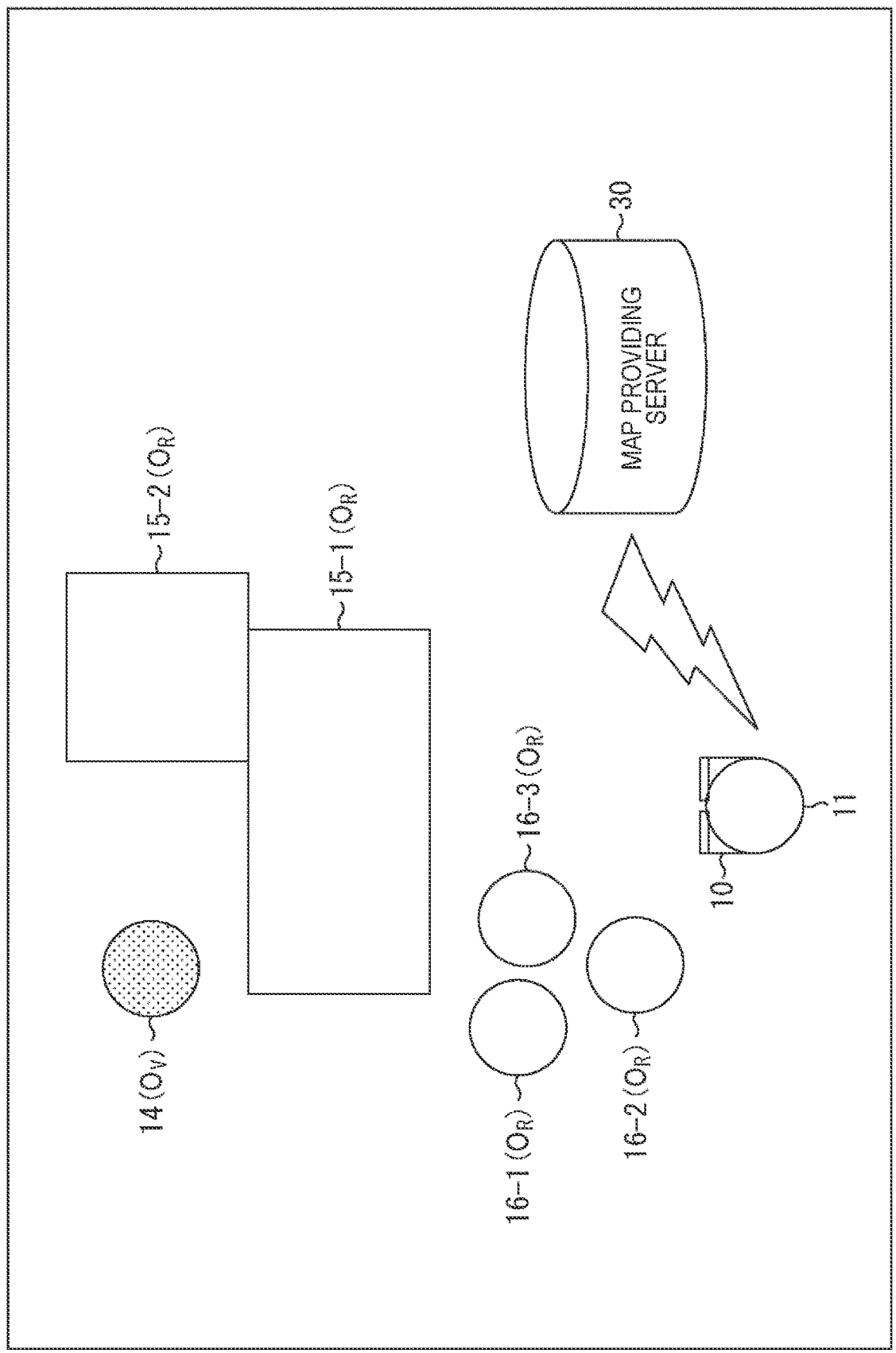
FIG. 18 is a diagram schematically illustrating a state of the virtual object hidden by the real objects.

Specifically, in a case where real objects $O_R$ existing on the map such as buildings 15-1 and 15-2 and real objects $O_R$ that do not exist on the map such as passers 16-1 to 16-3 exist in the real world as illustrated in FIG. 18, when the virtual object $O_V$ is shielded by the real object $O_R$ at the time when the virtual object $O_V$ such as the navigator 14 is presented to the user 11 wearing the client terminal 10, the following display is made.

That is, the client terminal 10 can focus and display the real object $O_R$, (for example, building 15-1) which can be specified by the map information, that shields the virtual object $O_V$ (for example, navigator 14). Furthermore, the client terminal 10 can display the real object $O_R$, (for example, passers 16-2 and 16-3) which cannot be specified by the map information, that shields the virtual object $O_V$ (for example, navigator 14) in a state where it is possible to recognize that the real object $O_R$ is shielding the virtual object $O_V$.

Figure 19:
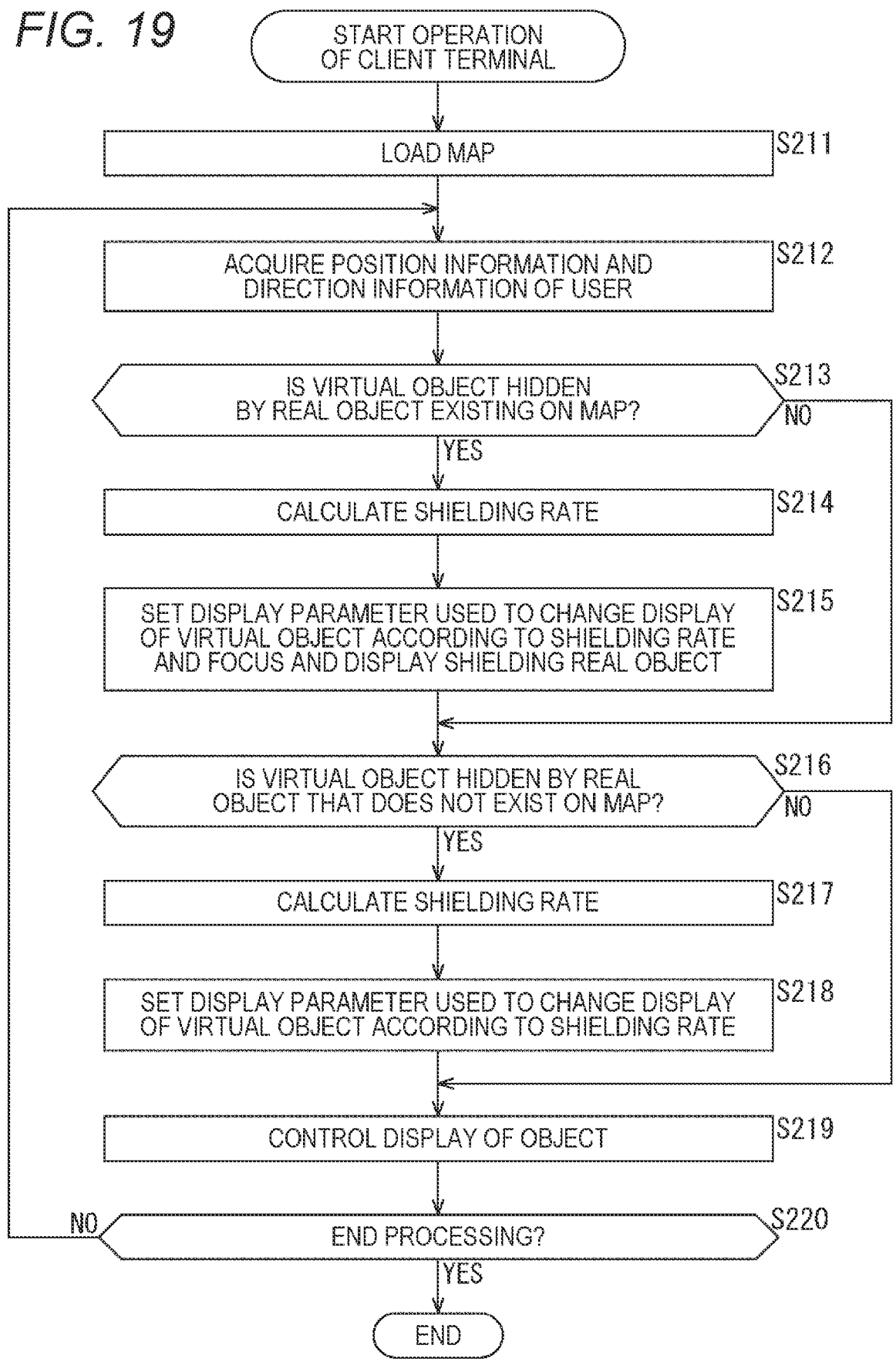
FIG. 19 is a flowchart for explaining an operation of the client terminal.

(Operation of Client Terminal) Next, an operation of the client terminal 10 will be described with reference to the flowchart in FIG. 19. Note that, here, as in the examples illustrated in FIGS. 17A, 17B, and 18, an operation of the client terminal 10 worn by the user 11 when the AR navigation service is provided will be described as an example.

In the client terminal 10, a map is loaded (S211). That is, the client terminal 10 transmits the position information to the map providing server 30 in advance and acquires three-dimensional map information from the map providing server 30 via the network 50 so that a map corresponding to a current position (that is, externally generated map) can be loaded.

In step S212, the position information acquisition unit 111 acquires the position information and the direction information of the user 11.

In step S213, the shielding determination unit 112 determines whether or not the virtual object $O_V$ such as the navigator 14 is hidden by the real object $O_R$ (for example, real object 15 such as building) existing on the map.

When the determination processing in step S213 is affirmative ("YES" in S213), the procedure proceeds to step S214. In step S214, the shielding rate calculation unit 113 calculates a shielding rate of the real object $O_R$ that is shielding the virtual object $O_V$ such as the navigator 14 and exists on the map (for example, building).

In step S215, the display parameter setting unit 114 sets a display parameter that changes display of the virtual object $O_V$ to display according to the shielding rate and performs focus display on the real object $O_R$ shielding the virtual object $O_V$.

Here, for example, in a case where the navigator 14 is shielded by the real object 15 which is one or a plurality of buildings or the like at the time when the AR navigation service is provided, a display parameter (first display parameter) is set that changes the display of a part of the navigator 14 shielded by the building to display before shielding and performs focus display (highlight) on the building that shields the navigator 14.

When the processing in step S215 ends, the procedure proceeds to step S216. Furthermore, when the determination processing in step S213 is negative ("NO" in S213), steps S214 and S215 are skipped, and the procedure proceeds to step S216.

In step S216, the shielding determination unit 112 determines whether or not the virtual object $O_V$ such as the navigator 14 is hidden by the real object $O_R$ that does not exist on the map (for example, real object 16 such as passer).

When the determination processing in step S216 is affirmative ("YES" in S216), the procedure proceeds to step S217. In step S217, the shielding rate calculation unit 113 calculates a shielding rate of the real object $O_R$ that shields the virtual object $O_V$ such as the navigator 14 and that does not exist on the map (for example, passer).

In step S218, the display parameter setting unit 114 sets a display parameter that changes the display of the virtual object $O_V$ according to the shielding rate.

Here, for example, in a case where the navigator 14 is shielded by the real object 16 such as one or a plurality of passers or the like at the time when the AR navigation service is provided, a display parameter (second display parameter) is set that changes display of a part of the navigator 14 shielded by the passer to the display before shielding.

When the processing in step S218 ends, the procedure proceeds to step S219. Furthermore, when the determination processing in step S216 is negative ("NO" in S216), steps S217 and S218 are skipped, and the procedure proceeds to step S219.

In step S219, the display control unit 105 controls display of the virtual object $O_V$ and the real object $O_R$.

For example, in this display control processing, when the determination processing in step S213 is affirmative ("YES" in S213), the display of the virtual object OV and the real object OR is controlled on the basis of the display parameter set in the processing in step S215. More specifically, as illustrated in FIG. 17B, display of the navigator 14 shielded by the front building is changed from the display before shielding, and the front building is focused and displayed (highlight).

Furthermore, for example, in the display control processing, when the determination processing in step S216 is affirmative ("YES" in S216), the display of the virtual object OV is controlled on the basis of the display parameter set in the processing in step S218. More specifically, as illustrated in FIG. 17B, the display of the navigator 14 shielded by the passer on the front side is changed from the display before shielding.

When the processing in step S219 ends, the procedure proceeds to step S220. In step S220, it is determined whether or not to end the processing.

When the determination processing in step S220 is negative ("NO" in S220), the procedure returns to step S212, and the processing in steps S212 to S220 is repeated, and then, the display of the virtual object $O_V$ and the real object $O_R$ is controlled. Furthermore, when the determination processing in step S220 is affirmative ("YES" in S220), the processing illustrated in FIG. 19 ends.

The operation of the client terminal 10 has been described above.

Note that, in the above description, as the augmented reality system in FIG. 1, a configuration is indicated in which the client terminals 10-1 to 10-N share the position information and the direction information by exchanging the data with the position sharing server 20 via the network 50. However, the client terminals 10-1 to 10-N may share the position information and the direction information by each directly exchanging data without providing the position sharing server 20.

Furthermore, in the above description, the position information and the direction information are exemplified as the information shared by the client terminals 10-1 to 10-N. However, it is not necessarily to share the direction information, and in addition, information other than the position information and the direction information may be shared. Moreover, as the position information shared by the client terminals 10-1 to 10-N, for example, an absolute position based on a signal obtained by the Global Positioning System (GPS) or the like may be used, in addition to, for example, a relative position with respect to the real object $O_R$, the virtual object $O_V$, or the like.

Furthermore, the client terminal 10 is configured as an electronic apparatus such as a wearable terminal, for example, a glass-type information terminal, a head mounted display (HMD), or the like. However, the display unit 106 of the client terminal 10 may be, for example, a transmissive display that displays a video on the inner side of the lens of the glasses or may be a closed type display that (completely) covers the field of view of the user 11.

Moreover, in the above description, each client terminal 10 generates the display parameter. However, by transmitting information (for example, information such as position information, direction information, or the like) used to generate the display parameter to a server on the network 50, and the server may generate (intensively process) the display parameter used by each client terminal 10 and transmit the display parameter to each client terminal 10 via the network 50.

Note that, in the network 50, not only wired communication and wireless communication, but also communication in which wireless communication and wired communication are mixed may be performed, that is, wireless communication may be performed in a certain section, and wired communication may be performed in another section. Moreover, in the network 50, communication from a certain device to another device may be performed by wired communication, and communication from the other device to the certain device may be performed by wireless communication.

4. Configuration of Computer

Figure 20:
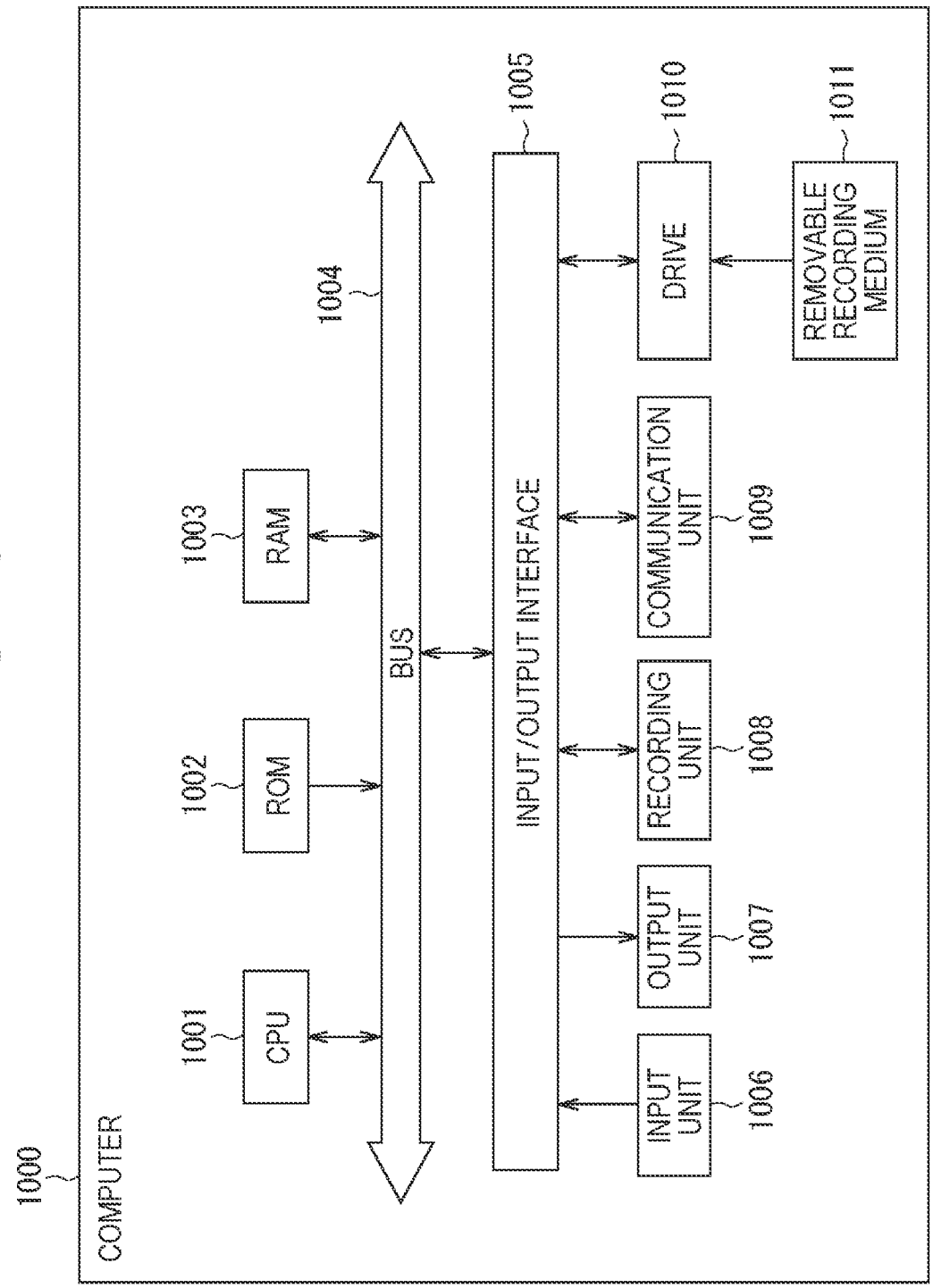
FIG. 20 is a diagram illustrating an example of a configuration of a computer.

The series of processing described above (for example, operation of client terminal 10 illustrated in FIG. 9 or 19) can be executed by hardware or software. When the series of the processing is performed by the software, a program included in the software is installed in a computer of each device. FIG. 20 is a block diagram illustrating an exemplary configuration of hardware of the computer for executing the above-mentioned series of processing by the program.

In a computer 1000, a Central Processing Unit (CPU) 1001, a Read Only Memory (ROM) 1002, and a Random Access Memory (RAM) 1003 are connected to each other with a bus 1004. In addition, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The recording unit 1008 includes a hard disk, a non-volatile memory, and the like. The communication unit 1009 includes a network interface and the like. The drive 1010 drives a removable recording medium 1011 such as a magnetic disk, an optical disk, an optical magnetic disk, or a semiconductor memory.

In the computer 1000 configured as above, the CPU 1001 executes the program recorded in the ROM 1002 and the recording unit 1008 by loading it to the RAM 1003 via the input/output interface 1005 and the bus 1004. According to this, the above-mentioned series of processing is executed.

The program executed by the computer 1000 (CPU 1001) can be provided, for example, by recording it to the removable recording medium 1011 as a package medium and the like. Furthermore, the program can be provided through wireless or wired transmission media such as a local area network, the Internet, and a digital satellite broadcast.

In the computer 1000, the program can be installed to the recording unit 1008 via the input/output interface 1005 by mounting the removable recording medium 1011 in the drive 1010. Furthermore, the program can be received by the communication unit 1009 via the wired or wireless transmission media and can be installed to the recording unit 1008. In addition, the program can be previously installed to the ROM 1002 and the recording unit 1008.

Here, in the present specification, it is not necessary to execute the processing, which is executed by the computer according to the program, in an order described in the flowchart in time series. That is, the processing executed by the computer according to the program includes processing executed in parallel or individually (for example, parallel processing or processing by object). Furthermore, the program may be performed by a single computer (processor), and distributed processing of the program may be executed by a plurality of computers.

Note that the embodiment of the present technology is not limited to the above-mentioned embodiments, and various changes can be made without departing from the scope of the technology according to the present disclosure.

Furthermore, each step of the series of processing (for example, operation of client terminal 10 illustrated in FIG. 9 or 19) can be executed by a single device or can be shared and executed by a plurality of devices. Moreover, when a plurality of kinds of processing is included in one step, the plurality of kinds of processing included in one step can be executed by the single device or can be divided and executed by the plurality of devices.

Note that the technology according to the present disclosure can have the following configurations.

(1)
An information processing apparatus including:
a display control unit configured to control a display so as to
display a virtual object by using a first display parameter in a first state where it is determined that the virtual object displayed by the display is hidden by at least one real object as viewed from a first user of the display and
display the virtual object by using a second display parameter different from the first display parameter in a second state where it is determined that the virtual object is hidden by real objects more than that in the first state as viewed from the first user.

(2)
The information processing apparatus according to (1), further including:
a determination unit configured to determine a degree of shielding of the virtual object by the real object, in which
the display control unit controls display of the virtual object by using a display parameter corresponding to a state according to a determination result of the degree of shielding by the determination unit.

(3)
The information processing apparatus according to (1) or (2), in which
each of the first display parameter and the second display parameter is associated with at least a single attribute of a display position, a display posture, a size, a color, or a transmittance with respect to the real object of the virtual object.

(4)
The information processing apparatus according to (3), in which
the first display parameter is a parameter used to display the virtual object at a first position according to the degree of shielding, and
the second display parameter is a parameter used to display the virtual object at a second position different from the first position according to the degree of shielding.

(5)
The information processing apparatus according to (4), in which
the first display parameter is a parameter used to change the display position of the virtual object to the first position, and
the second display parameter is a parameter used to change the display position of the virtual object to the second position.

(6)
The information processing apparatus according to (4) or (5), in which
at least one of the first display parameter or the second display parameter is a parameter to move the virtual object from a default display position to an upper position.

(7)
The information processing apparatus according to any one of (4) to (6), in which
the virtual object is an object that is not fixed to a surface in a real space.

(8)
The information processing apparatus according to (3), in which
the first display parameter is a parameter used to display the virtual object at a first transmittance according to the degree of shielding, and
the second display parameter is a parameter used to display the virtual object at a second transmittance different from the first transmittance according to the degree of shielding.

(9)
The information processing apparatus according to (8), in which
the first transmittance and the second transmittance are higher than zero % and are lower than 100% when it is assumed that complete transmission be 100% and complete opacity be zero %.

(10)
The information processing apparatus according to (9), in which
the first transmittance is a value lower than the second transmittance.

(11)
The information processing apparatus according to any one of (1) to (10), in which
the real object is a dynamic object.

(12)
The information processing apparatus according to (11), in which
the dynamic object includes a person.

(13)
The information processing apparatus according to (12), in which
the person is a second user who is different from the first user and receives provision of a service same as the first user receives.

(14)
The information processing apparatus according to (13), further including:
an acquisition unit configured to acquire position information of the first user and position information of the second user; and
a setting unit configured to set the first display parameter and the second display parameter on the basis of the position information of the first user and the position information of the second user.

(15)
The information processing apparatus according to (13) or (14), in which
the service is a service using Augmented Reality (AR).

(16)
The information processing apparatus according to any one of (1) to (15), in which
the display control unit
executes shielding processing on the virtual object on the basis of a shape of the real object on the basis of the first display parameter in the first state, and executes display processing on the virtual object on the basis of the second display parameter while preventing the shielding processing, in the second state.

(17)

The information processing apparatus according to any one of (1) to (16), configured as a mobile terminal including the display.

(18)

The information processing apparatus according to (17), in which the mobile terminal includes a wearable terminal or a head mounted display.

(19)

An information processing method including:

controlling a display by an information processing apparatus so as to display a virtual object by using a first display parameter in a first state where it is determined that the virtual object displayed by the display is hidden by at least one real object as viewed from a first user of the display and display the virtual object by using a second display parameter different from the first display parameter in a second state where it is determined that the virtual object is hidden by real objects more than that in the first state as viewed from the first user.

(20)

A program for causing a computer to function as a display control unit that controls a display so as to display a virtual object by using a first display parameter in a first state where it is determined that the virtual object displayed by the display is hidden by at least one real object as viewed from a first user of the display and display the virtual object by using a second display parameter different from the first display parameter in a second state where it is determined that the virtual object is hidden by real objects more than that in the first state as viewed from the first user.

REFERENCE SIGNS LIST

10, 10-1 to 10-N Client terminal
20 Position sharing server
30 Map providing server
50 Network
101 Measurement unit
102 Position estimation unit
103 Communication unit
104 Display method determination unit
105 Display control unit
106 Display unit
111 Position information acquisition unit
112 Shielding determination unit
113 Shielding rate calculation unit
114 Display parameter setting unit
115 Attribute determination unit
201 Control unit
202 Communication unit
301 Control unit
302 Communication unit
303 Map database
1000 Computer
1001 CPU
$O_R$ Real object
$O_V$ Virtual object

The invention claimed is:

1. An information processing apparatus, comprising:
a central processing unit (CPU) configured to:
determine a number of real objects that hides a virtual object as viewed from a first user;
control display of the virtual object based on a first display parameter in a first state in a case where the determined number of the real objects that hides the virtual object is less than a threshold; and
control the display of the virtual object based on a second display parameter in a second state in a case where the determined number of the real objects that hides the virtual object is equal to or greater than the threshold, wherein the second display parameter is different from the first display parameter.

2. The information processing apparatus according to claim 1, wherein the CPU is further configured to:
determine a degree of shielding of the virtual object by the real objects; and
control the display of the virtual object based on one of the first display parameter corresponding to the first state or the second display parameter corresponding to the second state, wherein the display of the virtual object is controlled based on a determination result of the degree of shielding.

3. The information processing apparatus according to claim 2, wherein each of the first display parameter and the second display parameter is associated with a single attribute of one of a display position, a display posture, a size, a color, or a transmittance of the virtual object with respect to the real objects.

4. The information processing apparatus according to claim 3, wherein the CPU is further configured to:
control the display of the virtual object at a first position based on the degree of shielding and the first display parameter,
control the display of the virtual object at a second position based on the degree of shielding and the second display parameter, wherein the second position is different from the first position.

5. The information processing apparatus according to claim 4, wherein the CPU is further configured to:
change the display position of the virtual object to the first position based on the first display parameter, and
change the display position of the virtual object to the second position based on the second display parameter.

6. The information processing apparatus according to claim 5, wherein at least one of the first display parameter or the second display parameter is a parameter to move the virtual object from a default display position on a display screen to an upper position of the display screen.

7. The information processing apparatus according to claim 6, wherein the virtual object is an object that is not fixed to a surface in a real space.

8. The information processing apparatus according to claim 3, wherein
the first display parameter is a parameter used to display the virtual object at a first transmittance based on the degree of shielding,
the second display parameter is a parameter used to display the virtual object at a second transmittance based on the degree of shielding, and
the second transmittance is different from the first transmittance.

9. The information processing apparatus according to claim 8, wherein the first transmittance and the second transmittance are higher than zero % and are lower than 100%, where 100% indicates complete transmission and zero % indicates complete opacity.

10. The information processing apparatus according to claim 9, wherein a value of the first transmittance is lower than a value of the second transmittance.

11. The information processing apparatus according to claim 1, wherein at least one real object of the real objects is a dynamic object.

12. The information processing apparatus according to claim 11, wherein the dynamic object includes a person.

13. The information processing apparatus according to claim 12, wherein
the person is a second user different from the first user, and
the person receives provision of a service same as the first user.

14. The information processing apparatus according to claim 13, wherein the CPU is further configured to:
acquire position information of the first user and position information of the second user; and
set the first display parameter and the second display parameter based on the position information of the first user and the position information of the second user.

15. The information processing apparatus according to claim 13, wherein the service utilizes Augmented Reality (AR).

16. The information processing apparatus according to claim 1, wherein the CPU is further configured to:
execute a shielding process on the virtual object based on a shape of the real objects and the first display parameter in the first state, and
execute a display process on the virtual object based on the second display parameter and prevent the shielding process in the second state.

17. The information processing apparatus according to claim 1, wherein the information processing apparatus is configured as a mobile terminal including a display screen.

18. The information processing apparatus according to claim 17, wherein the mobile terminal includes one of a wearable terminal or a head mounted display.

19. An information processing method, comprising:
in an information processing apparatus:
determining a number of real objects that hides a virtual object as viewed from a first user;
controlling display of the virtual object based on a first display parameter in a first state in a case where the determined number of the real objects that hides the virtual object is less than a threshold; and
controlling the display of the virtual object based on a second display parameter in a second state in a case where the determined number of the real objects that hides the virtual object is equal to or greater than the threshold, wherein the second display parameter is different from the first display parameter.

20. A non-transitory computer-readable medium having stored thereon computer-executable instructions which, when executed by a computer, cause the computer to execute operations, the operations comprising:
determining a number of real objects that hides a virtual object as viewed from a first user;
controlling display of the virtual object based on a first display parameter in a first state in a case where the determined number of the real objects that hides the virtual object is less than a threshold; and
controlling the display of the virtual object based on a second display parameter in a second state in a case where the determined number of the real objects that hides the virtual object is equal to or greater than the threshold, wherein the second display parameter is different from the first display parameter.

* * * * *